(12) United States Patent
Maru et al.

(10) Patent No.: US 11,204,757 B2
(45) Date of Patent: Dec. 21, 2021

(54) SERVER, SOFTWARE UPDATE SYSTEM, AND SOFTWARE UPDATE APPARATUS

(71) Applicant: HITACHI, LTD., Tokyo (JP)

(72) Inventors: Mitsunori Maru, Tokyo (JP);
Hidetoshi Teraoka, Tokyo (JP);
Haruki Oishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/935,571

(22) Filed: Jul. 22, 2020

(65) Prior Publication Data
US 2021/0026617 A1    Jan. 28, 2021

(30) Foreign Application Priority Data
Jul. 24, 2019    (JP) .............................. JP2019-136505

(51) Int. Cl.
G06F 9/445    (2018.01)
G06F 8/65    (2018.01)
H04L 29/08    (2006.01)

(52) U.S. Cl.
CPC ................ G06F 8/65 (2013.01); H04L 67/34 (2013.01)

(58) Field of Classification Search
CPC ................................... G06F 8/65; H04L 67/34
USPC .................................................. 717/168, 178
See application file for complete search history.

(56) References Cited

U.S. PATENT DOCUMENTS

| 7,546,595 B1 | 6/2009 | Wickham et al. |
| 2017/0364345 A1 | 12/2017 | Fontoura et al. |
| 2019/0354364 A1 | 11/2019 | Ruysuke |
| 2020/0371773 A1 * | 11/2020 | Kato ........................ G06F 8/65 |

FOREIGN PATENT DOCUMENTS

WO    2018/142751 A1    8/2018

OTHER PUBLICATIONS

Extended European Search Report dated Dec. 10, 2020 for European Patent Application No. 20187347.8.

* cited by examiner

Primary Examiner — Chuck O Kendall
(74) Attorney, Agent, or Firm — Volpe Koenig

(57) ABSTRACT

Updating software in consideration of a preceding software update state is performed in an electronic control unit of a vehicle. A server communicates with a software update apparatus that updates software of an in-vehicle control device. The server includes a software update sequence control unit that manages a software update to the in-vehicle control device. When a subsequent second software update is registered in the server during an application of a preceding first software update to the in-vehicle control device, the software update sequence control unit determines whether to interrupt the application of the first software update and start an application of the second software update to the in-vehicle control device based on information relating to the application of the first software update, information relating to the application of the second software update, and an update processing state of the first software update to the in-vehicle control device.

8 Claims, 24 Drawing Sheets

FIG. 3

| VEHICLE ID (311a) | MOUNTED ECU ID (311b) | CONTRACTOR NAME (311c) | CONTRACTOR PHONE NUMBER (311d) | CONTRACTOR EMAIL ADDRESS (311e) | CONTRACTOR ADDRESS (311f) |
|---|---|---|---|---|---|
| V100 | E1 ... | XXXX | YYYY | zzz@zzz.com | ABCD |
| ... | ... | ... | ... | ... | ... |

| ECU SW | ECU SW ID | UPLOAD TIME | UPLOADER NAME |
|---|---|---|---|
| P(ECU-SW) | E2-v4 | hh:mm | NNNN |
| ... | ... | ... | ... |

FIG. 5

| CP ID | PRIORITY | ACTIVATION PROCESSING TIME | TARGET VEHICLE ID | RECALL | RELATED FUNCTION | ECU ID | NUMBER OF MEMORY SIDES | ECU SW ID | COMBINATION RESTRAINT |
|---|---|---|---|---|---|---|---|---|---|
| ... | ... | ... | ... | ... | ... | ... | ... | ... | ... |
| CP005 | MEDIUM | 3 | V100, V105, ... | NO | STEERING | E1 | 2 | E1-v3 | E2-v4 |
| | | | | | | E2 | 2 | E2-v4 | E1-v3 |
| | | | | | | E3 | 2 | E3-v5 | - |
| CP006 | HIGH | 2 | V100, V105, ... | YES | BRAKE | E1 | 2 | E1-v4 | E2-v3, E3-v5 |
| | | | | | | E2 | 2 | E2-v3 | E1-v4 |
| ... | ... | ... | ... | ... | ... | ... | ... | ... | ... |

FIG. 6

| VEHICLE ID (314a) | UPDATE STATE (314b) | IN-APPLICATION CAMPAIGN ID (314c) | MOUNTED ECU ID (314d) | ECU SW ID (314e) |
|---|---|---|---|---|
| V100 | DURING INSTALLATION | CP005 | E1 | E1-v2 |
|  |  |  | E2 | E2-v3 |
|  |  |  | E3 | E3-v4 |
| V101 | NOT BEING UPDATED | – | E1 | E1-v2 |
|  |  |  | E2 | E2-v3 |
|  |  |  | E4 | E4-v6 |
| ... | ... | ... | ... | ... |

| CP ID | ECU SW | ECU ID | ECU SW ID | SW UPDATE INSTRUCTION INFORMATION |
|---|---|---|---|---|
| CP006 | P(E1-v4) | E1 | E1-v4 | •E1: INSTALL v4<br>•E2: DO NOT SWITCH EFFECTIVE SIDE<br>•E3: DO NOT CHANGE |
| | P(E2-v3) | E2 | E2-v3 | |

FIG. 9

| VEHICLE ID | UPDATE STATE | IN-APPLICATION CAMPAIGN ID | MOUNTED ECU ID | ECU SW ID |
|---|---|---|---|---|
| V100 | DURING INSTALLATION | CP005 | E1 | E1-v2 |
| | | | E2 | E2-v3 |
| | | | E3 | E3-v4 |

FIG. 10

| CP ID | PRIORITY | ACTIVATION PROCESSING TIME | TARGET VEHICLE ID | RECALL | RELATED FUNCTION | ECU ID | NUMBER OF MEMORY SIDES | ECU SW ID | SW HAVING COMBINATION CONSTRAINT |
|---|---|---|---|---|---|---|---|---|---|
| CP006 | HIGH | 2 | V100, V105, ... | YES | BRAKE | E1 | 2 | E1-v4 | E2-v3, E3-v5 |
| | | | | | | E2 | 2 | E2-v3 | E1-v4 |

FIG. 11

| CP ID | ECU SW | ECU ID | ECU SW ID | SW UPDATE INSTRUCTION INFORMATION |
|---|---|---|---|---|
| CP005 | P(E1-v4) | E1 | E1-v4 | ·E1: INSTALL v4<br>·E2: DO NOT SWITCH EFFECTIVE SIDE<br>·E3: DO NOT CHANGE |
| | P(E2-v3) | E2 | E2-v3 | |

FIG. 13

| PRIORITY | UPDATE STATE OF PRECEDING CP | CP APPLICATION SEQUENCE DEPENDENCY | ACTIVATION PROCESSING TIME | PROCESSING |
|---|---|---|---|---|
| PRECEDING CP < SUBSEQUENT CP | DURING DLING | NO | — | IMMEDIATELY INTERRUPT DLING OF PRECEDING CP AND DISCARD DLED DATA |
| | | YES | — | CONTINUE PRECEDING CP |
| | DURING INSTALLATION (ONTO ECU HAVING TWO MEMORY SIDES) | NO | — | IMMEDIATELY INTERRUPT INSTALLATION OF PRECEDING CP, DELETE DATA DURING INSTALLATION, AND DISCARD DLED DATA |
| | | YES | — | CONTINUE PRECEDING CP |
| | DURING WAITING FOR ACTIVATION (BEFORE IG-OFF OPERATION) | NO | — | • IMMEDIATELY INTERRUPT STATE DURING WAITING FOR ACTIVATION OF PRECEDING CP AND DISCARD DLED DATA<br>• CREATE UPDATE PKG (INCLUDING INSTRUCTION INFORMATION) WITH REFERENCE TO STATE AFTER PRECEDING CP IS INSTALLED |
| | | YES | — | CONTINUE PRECEDING CP |
| | DURING WAITING FOR ACTIVATION (AFTER IG-OFF OPERATION) | NO | LARGER THAN PREDETERMINED VALUE | • IMMEDIATELY INTERRUPT STATE DURING WAITING FOR ACTIVATION OF PRECEDING CP (FACILITATE PERMISSION OF SUBSEQUENT CP ON SUBSEQUENT CP PERMISSION SCREEN) AND DISCARD DLED DATA<br>• CREATE UPDATE PKG (INCLUDING INSTRUCTION INFORMATION) WITH REFERENCE TO STATE AFTER PRECEDING CP IS INSTALLED |
| | | NO | EQUAL TO OR LESS THAN PREDETERMINED VALUE | CONTINUE PRECEDING CP |
| | | YES | — | CONTINUE PRECEDING CP |
| | DURING ACTIVATION (INCLUDING INSTALLATION ONTO ECU HAVING ONE MEMORY SIDE) | — | — | CONTINUE PRECEDING CP |

SERVER, SOFTWARE UPDATE SYSTEM, AND SOFTWARE UPDATE APPARATUS

BACKGROUND OF THE INVENTION

1. Field of the Invention

The present invention relates to a server, a software update system, and a software update apparatus.

2. Description of the Related Art

In recent years, with the development of a driving support function and an automatic driving technique, a scale of software mounted on an electronic control unit (ECU) of an automobile has been increased. Accompanying with an increase in the scale of software, the number of times of recall caused by an ECU software defect or the number of automobiles to be recalled increases. On the other hand, with the development of a communication network, a sign is seen in which a connected car that is an automobile wirelessly connected to a central system or the like spreads widely.

Under such a circumstance, a wireless remote software update technique (over the air (OTA)) used in a mobile phone in the related art is applied to an automobile, and there are increasing needs for an automobile remote software update technique for remotely updating software of an in-vehicle device such as an ECU. Since software of an electronic control unit has a great influence on safety and security of an automobile, an early application of update software is required for a serious vulnerability or a bug.

Under such a background, for example, WO 2018/142751 (Patent Literature 1) discloses a software update method for an electronic control unit that interrupts downloading of update software having a low priority and preferentially downloads update software having a high priority when the update software having a high priority is added during downloading of the update software having a low priority. In this manner, important update software can be applied in an early stage.

However, only a state during downloading of the update software is considered as a software update state of the electronic control unit in the related art described above, and other states are not considered. Software update states of the electronic control unit include the following states in addition to the state during downloading of the update software from a server to a vehicle. For example, the software update states include during installation of the update software onto a target ECU after the downloading of the update software is completed, during waiting for activation of the update software after the installation of the update software is completed, during activation in which it is switched to a memory side where the update software is installed and the update software is activated in the target ECU.

As described above, since only the state during downloading of preceding update software having a low priority is considered in the related art, the related art has a problem in which subsequent update software having a high priority is not applied in an early stage when the subsequent update software having a high priority is added at the time of a state other than the state during downloading.

SUMMARY OF THE INVENTION

The invention has been made in view of the above circumstances, and an object of the invention is to consider an update state of preceding software in an electronic control unit of a vehicle and apply important subsequent update software in an early stage.

In order to solve this problem and achieve the object, the invention provides a server that communicates, via a network, with a software update apparatus that updates software of an in-vehicle control device mounted on a vehicle. The server includes a control unit that manages an application of a software update to the in-vehicle control device. When a subsequent second software update to be applied to the in-vehicle control device is registered in the server during an application of a preceding first software update to the in-vehicle control device, the control unit determines whether to interrupt the application of the first software update and start the application of the second software update to the in-vehicle control device based on information relating to the application of the first software update, information relating to the application of the second software update, and an update processing state of the first software update to the in-vehicle control device.

According to the present invention, for example, an update state of preceding software is considered in the electronic control unit of the vehicle, and important subsequent update software is applied in an early stage.

BRIEF DESCRIPTION OF THE DRAWINGS

FIG. 3 is a diagram showing a configuration example of a vehicle information management table according to the first embodiment.

FIG. 4 is a diagram showing a configuration example of a table in a vehicle SW repository according to the first embodiment.

FIG. 5 is a diagram showing a configuration example of a campaign management table according to the first embodiment.

FIG. 6 is a diagram showing a configuration example of a vehicle SW update management table according to the first embodiment.

FIG. 7 is a diagram showing a configuration example of an update package according to the first embodiment.

FIG. 9 is a diagram showing an example of vehicle configuration synchronization information stored in the software update apparatus according to the first embodiment.

FIG. 10 is a diagram showing an example of campaign information stored in the software update apparatus according to the first embodiment.

FIG. 11 is a diagram showing an example of an update package stored in the software update apparatus according to the first embodiment.

FIG. 13 is a diagram showing an example of processing corresponding to a preceding CP application interruption determination result according to the first embodiment.

DESCRIPTION OF THE PREFERRED EMBODIMENTS

Figure 1:
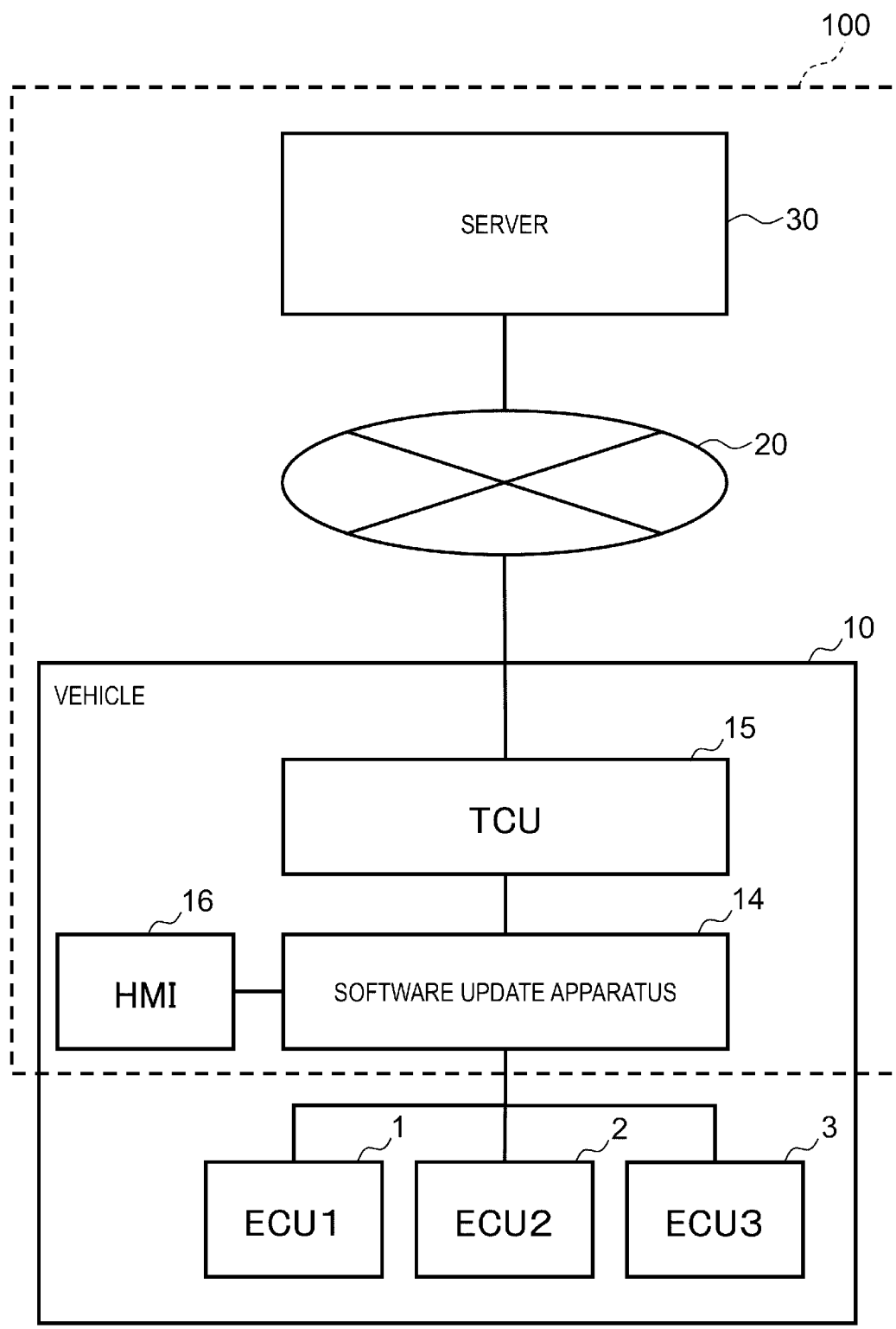
FIG. 1 is a diagram showing a configuration example of a software update system according to a first embodiment.

Hereinafter, embodiments of the invention will be described with reference to the drawings. In the drawings of the present specification, the same reference numerals refer to the same or similar configuration or processing. In the following embodiments, only differences from a foregoing embodiment will be described, and repeated descriptions may be omitted. A part of or all of configurations of embodiments and modifications may be combined appropriately within a scope of a technical idea of the invention and a matching range.

First Embodiment

In the first embodiment, in response to "vehicle configuration synchronization" when the ignition of a vehicle is on (activated), a server such as a telematics center determines whether to interrupt an application of a preceding campaign and perform an application of a subsequent campaign on an ECU mounted on the vehicle. If a priority of the subsequent campaign is higher than a priority of the preceding campaign and the preceding campaign is in any one of during downloading, during installation, and during waiting for activation, the application of the preceding campaign is interrupted and the application of the subsequent campaign is started. The campaign is a unit of an event in which a software update of the ECU is performed, and includes a user-desired additional function in the present embodiment.

Hereinafter, ignition may be referred to as IG, ignition-on may be referred to as IG-ON, ignition-off may be referred to as IG-OFF, a campaign may be referred to as a CP, software may be referred to as SW, and download may be referred to as DL.

(Configuration of Software Update System 100 According to First Embodiment)

FIG. 1 is a diagram showing a configuration example of the software update system 100 according to the first embodiment. The software update system 100 manages software updates for various types of electronic control units (ECU) mounted on a vehicle 10, and includes a server 30 such as a telematics center, a software update apparatus 14 mounted on the vehicle 10, and a telematics control unit (TCU) 15.

The vehicle 10 includes various types of ECUs 1, 2, and 3, the software update apparatus 14, and the TCU 15. Although the ECUs provided in the vehicle 10 include three ECUs 1, 2, and 3 in FIG. 1, the number of ECUs is merely an example. Types of the ECUs include various types such as an engine ECU, a steering ECU, and a brake ECU. FIG. 1 shows configurations related to the first embodiment, and other configurations are omitted.

The software update apparatus 14 and the server 30 are connected to each other via the TCU 15 and a network 20. The network 20 may be a short-range wireless communication network such as a mobile phone network, Internet, and a wireless local area network (LAN), or a network formed by combining a plurality of these networks. The server 30 can communicate with the software update apparatus 14 by such a connection.

The ECUs 1, 2, and 3 are connected to the software update apparatus 14. The software update apparatus 14 applies update software included in a CP received from the server 30 to the ECUs 1, 2, and 3 to be updated.

A human machine interface (HMI) 16 such as a car navigation including a display device is connected to the software update apparatus 14. A detailed configuration of the software update apparatus 14 will be described later.

Although only one vehicle 10 mounted with the software update apparatus 14 is shown in FIG. 1, the number of the vehicle 10 is not limited to one. A plurality of vehicles 10 may be respectively mounted with the software update apparatus 14 and connected with the server 30.

The server 30 transmits, to the vehicle 10, the update software used for updating software of the ECUs 1, 2, and 3 mounted on the vehicle 10 via the network 20. A detailed configuration of the server 30 will be described later.

(Configuration of Server 30 According to First Embodiment)

Figure 2:
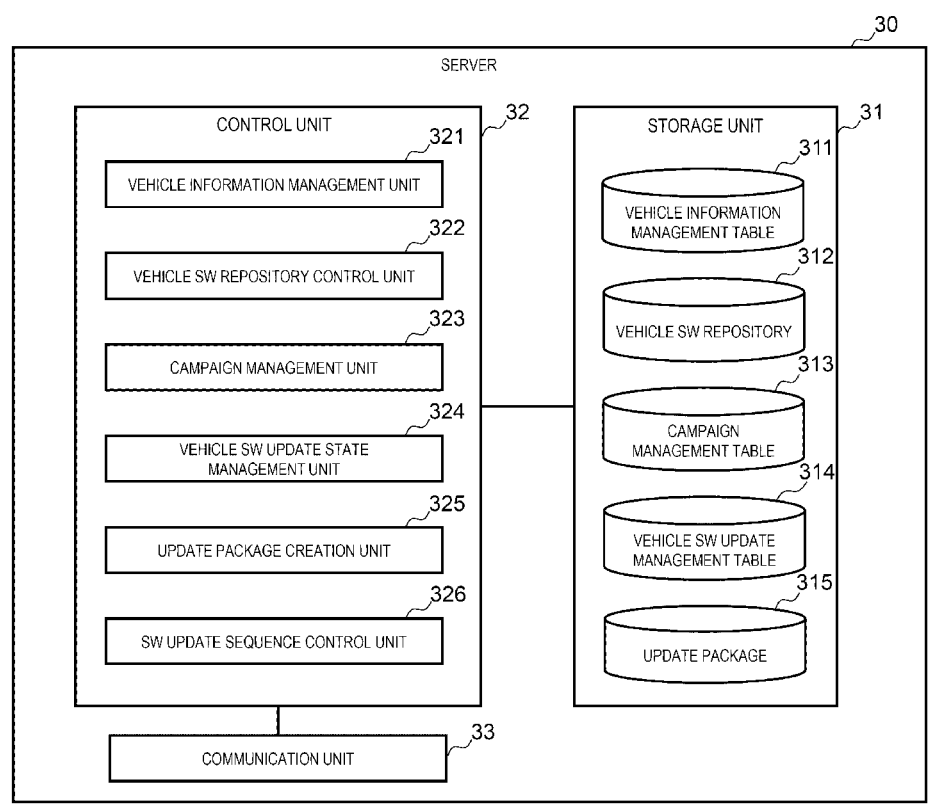
FIG. 2 is a diagram showing a configuration example of a server according to the first embodiment.

FIG. 2 is a diagram showing a configuration example of the server 30 according to the first embodiment. The server 30 is a computer called a telematics center, and transmits, to the vehicle 10, the update software for updating software of the ECUs 1, 2, and 3 mounted on the vehicle 10 via the network 20. The server 30 includes a storage unit 31 such as a hard disk drive (HDD) and a solid state drive (SSD), a control unit 32 implemented by executing a program by a cooperation of a central processing unit (CPU) and a random access memory (RAM), and a communication unit 33. An operation terminal (not shown) to be operated by an operator is connected to the server 30.

The storage unit 31 stores a vehicle information management table 311, a vehicle SW repository 312, a campaign management table 313, a vehicle SW update management table 314, and an update package 315. Although an example is described in which information and data are managed in a table format in the tables and the repository, the invention is not limited to the table format.

The control unit 32 includes a vehicle information management unit 321, a vehicle SW repository control unit 322, a campaign management unit 323, a vehicle SW update state management unit 324, an update package creation unit 325, and an SW update sequence control unit 326. The vehicle information management unit 321, the vehicle SW repository control unit 322, the campaign management unit 323, the vehicle SW update state management unit 324, and the update package creation unit 325 respectively perform data management of the vehicle information management table 311, the vehicle SW repository 312, the campaign management table 313, the vehicle SW update management table 314, and the update package 315. The SW update sequence control unit 326 executes main processing of the server 30 in CP application processing which will be described later with reference to FIGS. 12, 15, 16, 17, and 18.

FIG. 3 is a diagram showing a configuration example of the vehicle information management table 311 according to the first embodiment. The vehicle information management table 311 includes columns of a vehicle ID 311a, a mounted ECU ID 311b, a contractor name 311c, a contractor phone number 311d, a contractor email address 311e, and a contractor address 311f. In the vehicle information management table 311, a target vehicle ID to which a CP is applied can be specified using the mounted ECU ID 311b as a key.

When the vehicle 10 is manufactured, the vehicle information management unit 321 writes values for identifying the vehicle and the mounted ECU into fields of respective columns of the vehicle ID 311a and the mounted ECU ID 311b. When the vehicle 10 is sold, the vehicle information management unit 321 writes various pieces of personal information of a purchaser of the vehicle 10 into fields of respective columns of the contractor name 311c, the contractor phone number 311d, the contractor mail address 311e, and the contractor address 311f.

FIG. 4 is a diagram showing a configuration example of a table in the vehicle SW repository 312 according to the first embodiment. The table in the vehicle SW repository 312 includes respective columns of an ECU SW 312a, an ECU SW ID 312b, upload time 312c, and an uploader name 312d. When an update package is created before a DLing request is transmitted to the software update apparatus 14, the update package creation unit 325 refers to the table in the vehicle SW repository 312 and acquires update SW having a version necessary for the update package.

When a new version is created for the update SW in a unit of an ECU, the vehicle SW repository control unit 322 uploads program data of the update SW to a field of a column of the ECU SW 312a. The vehicle SW repository control unit 322 writes identification information of the update SW including version information into a field of a column of the ECU SW ID 312b. The vehicle SW repository control unit 322 writes upload time and an uploader name of the update SW to respective columns of the upload time 312c and the uploader name 312d.

FIG. 5 is a diagram showing a configuration example of the campaign management table 313 according to the first embodiment. The campaign management table 313 manages campaign information including an application priority, information of a target ECU, and the like under the control of the campaign management unit 323. The campaign management table 313 includes respective columns of a CP ID 313a, a priority 313b, activation processing time 313c, a target vehicle ID 313d, recall 313e, a related function 313f, an ECU ID 313g, the number of memory sides 313h, an ECU SW ID 313i, and a combination constraint 313j.

The CP ID 313a is identification information of a CP. The priority 313b is information indicating an application priority of a CP to be applied to a target ECU at a plurality of levels such as "high", "medium", and "low", and is information for determining that an application of a preceding CP is interrupted and an application of a subsequent CP is to be performed. For example, when a subsequent CP having a "high" "priority" is added during an application of a preceding CP having a "medium" "priority" to the target ECU, the application of the preceding CP having a "medium" "priority" is interrupted and an application of the subsequent CP having a "high" "priority" is started. In terms of a vehicle control, a "high" "priority" refers to that a CP corresponds to an SW update having a high importance degree of safety and security.

The activation processing time 313c is time required for an activation processing when a CP is applied to a target ECU, and is used for determining interruption of the application of the preceding CP. When an update state of the preceding CP is during waiting for activation (after an IG-OFF operation), it is determined to interrupt the application of the preceding CP and prioritize the application of the subsequent CP if the activation processing time 313c is larger than a predetermined value, and it is determined to continue the application of the preceding CP if the activation processing time 313c is equal to or less than the predetermined value.

The target vehicle ID 313d is identification information of a target vehicle to which a CP is applied. The recall 313e indicates whether a CP should be recalled. The related function 313f indicates a vehicle function to be controlled by an ECU to be updated by a CP.

The ECU ID 313g is identification information of an ECU whose software is to be updated by a CP. The number of memory sides 313h indicates the number of memory sides of each ECU whose software is to be updated. The ECU SW ID 313i is identification information including version information of update SW provided for each ECU whose software is to be updated by a CP. In FIG. 5, for example, "E1-v3" refers to update SW having a version of "v3" for an ECU having an "ECU ID" of "E1".

The combination constraint 313j indicates, for example, whether a "sequence dependency" with SW included in another CP is present regarding an application of the SW. The "sequence dependency" refers to that there is a constraint in an application sequence between the SW and SW included in another CP. In the example shown in FIG. 5, an "ECU SW ID" of "E1-v4" corresponding to a "CP ID" of "CP006" and an "ECU ID" of "E1" includes "E3-v5" in the "combination constraint" and the "E3-v5" is present in an "ECU SW ID" included in a "CP ID" of "CP005". In this case, "CP IDs" of "CP005" and "CP006" have the "sequence dependency". The "sequence dependency" refers to an application possibility of a subsequent CP on an assumption that a preceding CP has been applied, so that the "CP ID" of "CP006" cannot be applied when the "CP ID" of "CP005" is not applied in the example shown in FIG. 5.

However, the combination constraint 313j is not limited to the "sequence dependency" described above, and may be, for example, a combination constraint of update SW respectively installed on a plurality of ECUs.

FIG. 6 is a diagram showing a configuration example of the vehicle SW update management table 314 according to the first embodiment. Under the control of the vehicle SW update state management unit 324, the vehicle SW update management table 314 manages an update state indicating an update processing stage of SW of the vehicle 10, a current version (an ECU SW ID), and the like. Information registered in the vehicle SW update management table 314 is information transmitted from the vehicles 10 by the "vehicle configuration synchronization" when the vehicles 10 are IG-ON.

The vehicle SW update management table 314 includes respective columns of a vehicle ID 314a, an update state 314b, an in-application campaign ID 314c, a mounted ECU ID 314d, and an ECU SW ID 314e.

The vehicle ID 314a is identification information of the vehicle 10, which is a management unit of the update state 314b. The update state 314b indicates a state during updating SW by applying a CP, or a state during non-updating. The state during updating SW includes "during DLing", "during installation", "during waiting for activation (before an IG-OFF operation)", "during waiting for activation (after an IG-OFF operation)", "during activation", and the like.

"During DLing" refers to a state from when a user of the vehicle 10 permits a CP up to when the software update apparatus 14 completes DLing of an update package from the server 30. "During installation" refers to a state from when the DLing is completed up to when each ECU completes installation of update SW after the software update apparatus 14 transmits the update SW to an ECU having two memory sides. "During installation", the software update apparatus 14 does not transmit the update SW for an ECU having one memory side to a target ECU, and holds the update SW in a storage area of the software update apparatus 14. The ECU having two memory sides includes a nonvolatile storage area having two sides. Update SW can be installed at an ineffective side during an operation of SW installed at an effective side by switching any one of the two sides to be the effective side. The ECU having one memory side includes a nonvolatile storage area having only one side.

"During waiting for activation (before an IG-OFF operation)" refers to a state from when the installation is completed up to when the IG-OFF operation is performed. "During waiting for activation (after an IG-OFF operation)" refers to a state from when the IG-OFF operation is performed after the installation is completed up to when activation is started in the vehicle 10 after the user inputs CP permission. When "during waiting for activation (before an IG-OFF operation)" and "during waiting for activation (after an IG-OFF operation)" are collectively referred to as "during waiting for activation", "during waiting for activation" refers to a state from when the installation is completed up to when activation is started in the vehicle 10.

"During activation" refers to a state from when the activation is started up to when switching to an effective memory side for each ECU in the vehicle 10 is completed. "During activation", the software update apparatus 14 transmits update SW for the ECU having one memory side that is held in the software update apparatus 14 to a target ECU. The target ECU that has received the update SW for the ECU having one memory side overwrites and installs the update SW onto a memory having one side.

The in-application campaign information 314c indicates identification information of an in-application CP for each "vehicle ID". The mounted ECU ID 314d is identification information of an ECU mounted on each vehicle 10. The ECU SW ID 314e is identification information including version information of SW applied to each ECU mounted on each vehicle.

FIG. 7 is a diagram showing a configuration example of the update package 315 according to the first embodiment. Before a DLing request of an update package is transmitted to the software update apparatus 14 or when a new CP is registered in the server 30, the update package creation unit 325 creates an update package for each CP including the update SW for a target ECU with reference to the vehicle SW repository 312 and the campaign management table 313. Hereinafter, a package may be referred to as a PKG.

The update package 315 is created for each CP and includes a CP ID 315a, ECU SW 315b, an ECU ID 315c, an ECU SW ID 315d, and SW update instruction information 315e. The CP ID 315a is identification information of a target CP of an update PKG. The ECU SW 315b is program data of update SW included in an update PKG of a CP identified by the CP ID 315a.

The ECU ID 315c is identification information of a target ECU of update SW identified by the ECU SW 315b. The ECU SW ID 315d is identification information of update SW including version information.

The SW update instruction information 315e is a detailed content of an SW update that instructs each ECU in consideration of a combination constraint of each SW and the number of memory sides of each ECU when an update PKG of a CP identified by the CP ID 315a is applied to a target vehicle. An update PKG of each CP is applied to each target ECU according to the SW update instruction information 315e, so that an installation state of a memory of each ECU, for example, after installation of the preceding CP and before activation of the preceding CP can be used and the subsequent CP can be efficiently applied.

(Configuration of Software Update Apparatus According to First Embodiment)

Figure 8:
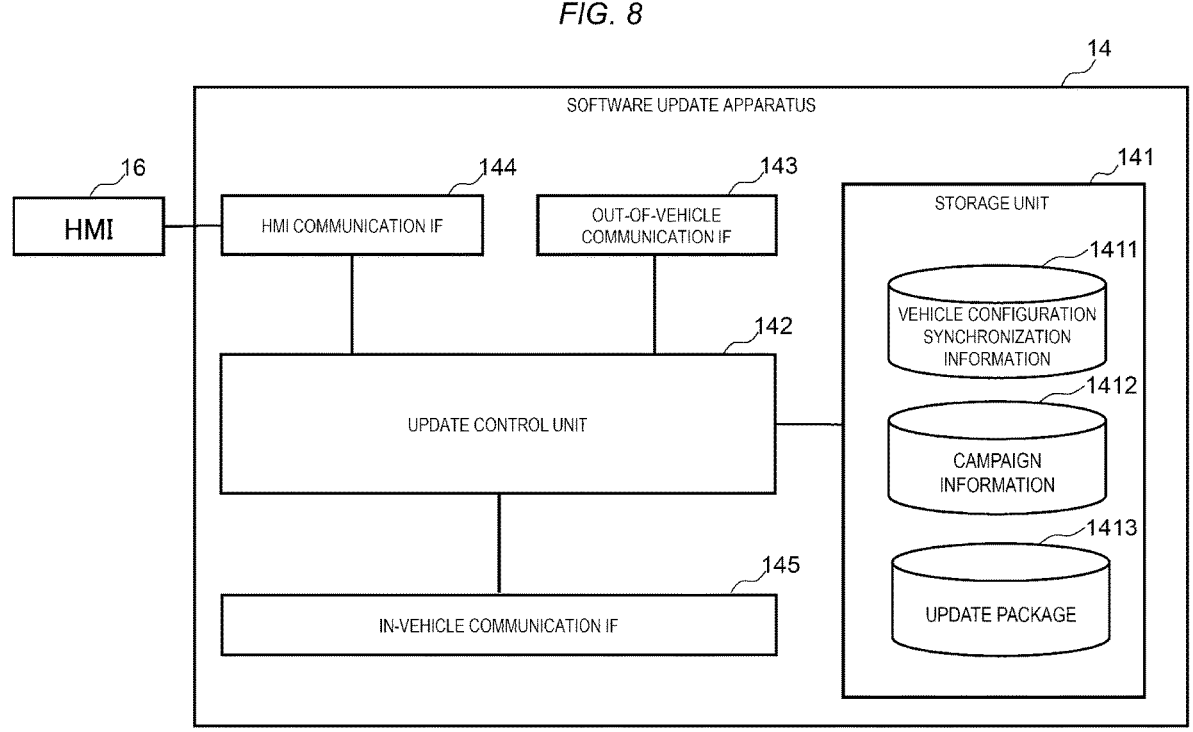
FIG. 8 is a diagram showing a configuration example of a software update apparatus according to the first embodiment.

FIG. 8 is a diagram showing a configuration example of the software update apparatus 14 according to the first embodiment. The software update apparatus 14 is also referred to as an OTA master, and includes a storage unit 141 such as an HDD or an SSD, an update control unit 142 that is implemented by executing a program by a cooperation of a CPU and a RAM, a communication unit 33, an out-of-vehicle communication IF 143, an HMI communication IF 144, and an in-vehicle communication IF 145.

The out-of-vehicle communication IF 143 is an interface for communicating with the server 30 via the TCU 15 and the network 20. The HMI communication IF 144 is an interface to which the HMI 16 is connected. The in-vehicle communication IF 145 includes a high-speed communication IF for connecting to a high-speed in-vehicle network such as the Ethernet (registered trademark), and a low-speed communication IF for connecting to a low-speed in-vehicle network such as a controller area network (CAN). The ECUs 1, 2, and 3 mounted on the vehicle 10 are connected with the update control unit 142 via the in-vehicle communication IF 145.

The storage unit 141 stores vehicle configuration synchronization information 1411, campaign information 1412, and an update package 1413.

FIG. 9 is a diagram showing an example of the vehicle configuration synchronization information 1411 stored in the software update apparatus 14 according to the first embodiment. The vehicle configuration synchronization information 1411 is collected by the update control unit 142 at the time of IG-ON of the vehicle 10, stored in the storage unit 141, and transmitted to the server 30 via the out-of-vehicle communication IF 143.

The vehicle configuration synchronization information 1411 includes a vehicle ID 1411a, an update state 1411b, an in-application campaign ID 1411c, a mounted ECU ID 1411d, and an ECU SW ID 1411e. The vehicle configuration synchronization information 1411 is the same as a record of the corresponding vehicle 10 in the vehicle SW update management table 314 shown in FIG. 6.

FIG. 10 is a diagram showing an example of the campaign information 1412 stored in the software update apparatus 14 according to the first embodiment. The campaign information 1412 is latest CP information notified from the server 30.

The campaign information 1412 includes a CP ID 1412a, a priority 1412b, an activation processing time 1412c, a target vehicle ID 1412d, recall 1412e, a related function 1412f, an ECU ID 1412g, the number of memory sides 1412h, an ECU SW ID 1412i, and a combination constraint 1412j. The campaign information 1412 is the same as a latest record notified to the corresponding vehicle 10 in the campaign management table 313 shown in FIG. 5.

FIG. 11 is a diagram showing an example of the update package 1413 stored in the software update apparatus 14 according to the first embodiment. The update package 1413 includes a CP ID 1413a, ECU SW 1413b, an ECU ID 1413c, an ECU SW ID 1413d, and SW update instruction information 1413e. The update package 1413 is a latest update PKG received from the server 30 in the update package 315 shown in FIG. 7.

(CP Application Processing Sequence According to First Embodiment)

Figure 12:
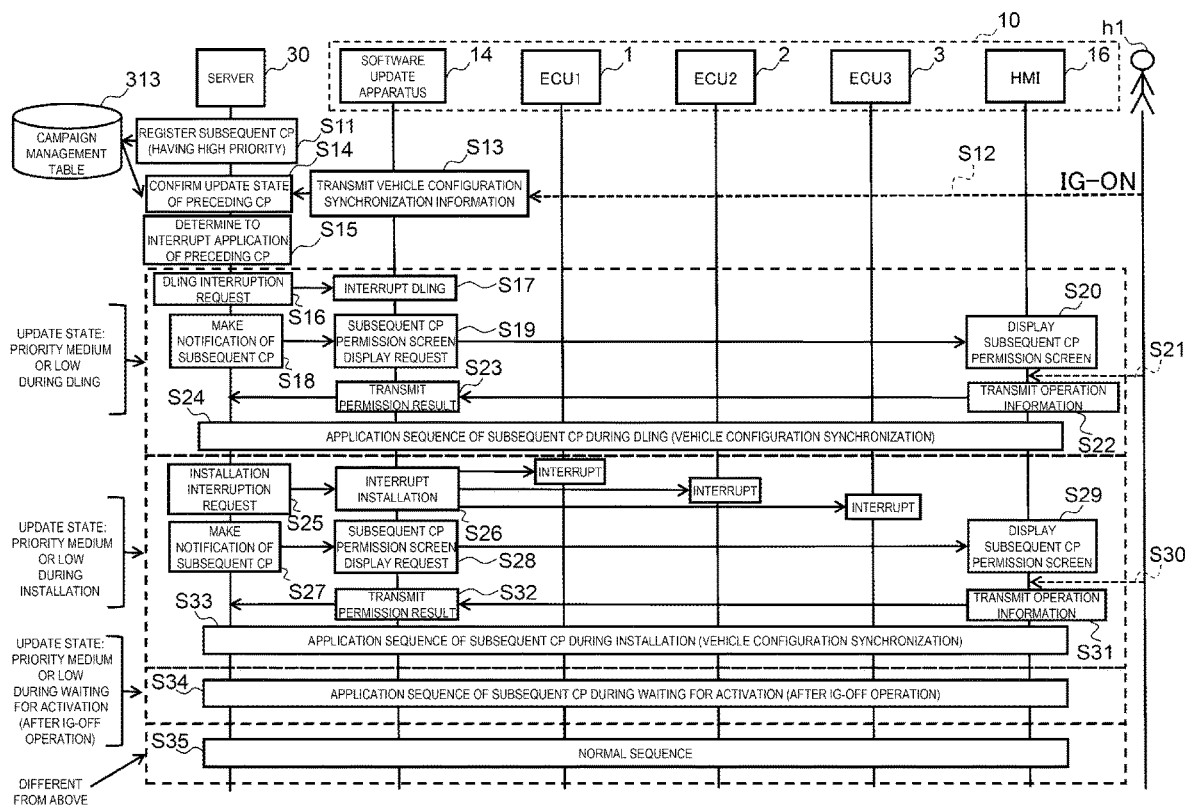
FIG. 12 is a diagram showing an example of a CP application processing sequence (a vehicle configuration synchronization trigger) according to the first embodiment.

FIG. 12 is a diagram showing an example of a CP application processing sequence (a vehicle configuration synchronization trigger) according to the first embodiment. In the present embodiment, whether to interrupt an application of a preceding CP and start an application of a subsequent CP is determined in response to the "vehicle configuration synchronization" when the vehicle 10 is IG-ON by a user h1.

First in step S11, the server 30 receives a subsequent CP and corresponding update SW, registers campaign information of the subsequent CP in the campaign management table 313, and registers the update SW in the vehicle SW repository 312. Subsequently in step S12, the vehicle 10 is IG-ON by the user h1. Next in step S13, in response to the IG-ON in step S12, the software update apparatus 14 transmits the vehicle configuration synchronization information 1411 to the server 30.

Subsequently in step S14, the server 30 confirms an update state of the preceding CP in the vehicle 10 based on the vehicle configuration synchronization information 1411 received from the software update apparatus 14, and refers to the campaign management table 313 to confirm priorities of the preceding CP and the subsequent CP and a CP application sequence dependency.

Next in step S15, the server 30 determines whether to interrupt the application of the preceding CP and start the application of the subsequent CP based on the priorities of the preceding CP and the subsequent CP confirmed in step S14, an update state of the preceding CP, and an application sequence dependency of the subsequent CP with respect to the preceding CP.

(Processing According to Preceding CP Application Interruption Determination Result)

A determination logic of step S15 in FIG. 12 will be described with reference to FIG. 13. FIG. 13 is a diagram showing an example of processing corresponding to a preceding CP application interruption determination result according to the first embodiment. Although not shown in FIG. 13, when a "priority" relationship satisfies the preceding CP the subsequent CP, the application of the preceding CP is not interrupted and the application of the preceding CP is completed.

On the other hand, when a "priority" relationship satisfies "the preceding CP<the subsequent CP", processing as to whether to interrupt or continue and complete the preceding CP is different corresponding to a "preceding CP update state", a "CP application sequence dependency", and "activation processing time" as shown in FIG. 13. The "priority" and the "CP application sequence dependency" are examples of information relating to an application of a campaign in campaign information. The "activation processing time" is estimated time required for processing during activation.

As shown in FIG. 13, when the "CP application sequence dependency" is "YES" or the "preceding CP update state" is "during activation (including during installation onto an ECU having one memory side)", the preceding CP is continued. When the "CP application sequence dependency" is "NO", processing as to whether to interrupt the preceding CP or continue and complete the preceding CP is different corresponding to the "preceding CP update state" and the "activation processing time".

Hereinafter, a case in which the "CP application sequence dependency" is "NO" will be described. When the "preceding CP update state" is "during DLing", the DLing of the preceding CP is immediately interrupted and DLed data is discarded to the software update apparatus 14. When the "preceding CP update state" is "during installation (onto an ECU having two memory sides)", the installation of the preceding CP is immediately interrupted, data during installation onto a memory of the ECU is deleted and DLed data is discarded to the software update apparatus 14.

When the "preceding CP update state" is "during waiting for activation (before an IG-OFF operation)", the state during waiting for activation of the preceding CP is immediately interrupted, DLed data is discarded to the software update apparatus 14, and an update PKG (including instruction information) is created with reference to a state after the preceding CP is installed.

When the "preceding CP update state" is "during waiting for activation (after an IG-OFF operation)" and the "activation processing time" is "larger than a predetermined value", the state during waiting for activation of the preceding CP is immediately interrupted (to facilitate permission of the subsequent CP on a subsequent CP permission screen (reference)), DLed data is discarded, and an update PKG (including instruction information) is created with reference to a state after the preceding CP is installed. When the "preceding CP update state" is "during waiting for activation (after an IG-OFF operation)" and the "activation processing time" is "equal to or less than a predetermined value", the preceding CP is continued.

Return to FIG. 12. Hereinafter, steps S16 to S24 are processing when it is determined in step S15 that the priority of the preceding CP<the priority of the subsequent CP (the priority of the preceding CP is "medium or low" and the priority of the subsequent CP is "high" in the example shown in FIG. 12), an update state of the preceding CP is during DLing, and the subsequent CP has no CP application sequence dependency with respect to the preceding CP.

In step S16, the server 30 transmits a preceding CP DLing interruption request to the software update apparatus 14. Subsequently in step S17, the software update apparatus 14 interrupts the DLing of the preceding CP in response to the DLing interruption request, and discards DLed data in the storage area of the software update apparatus 14.

Figure 14:
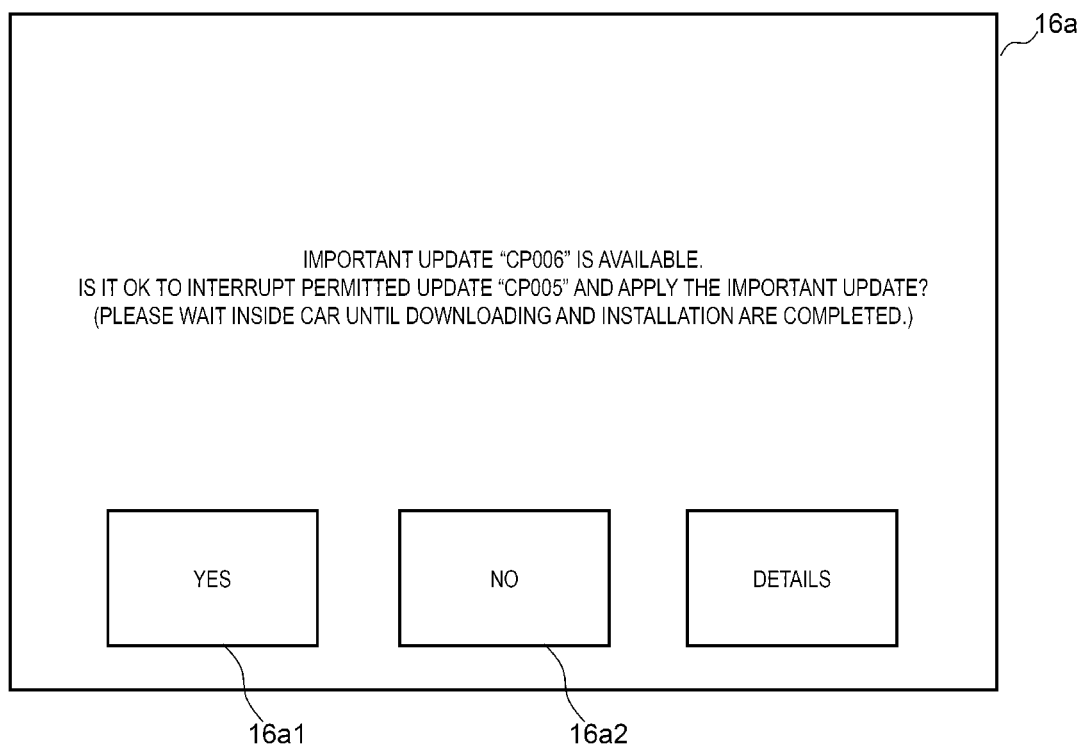
FIG. 14 is a diagram showing an example of a subsequent CP permission screen according to the first embodiment.

Next in step S18, the server 30 notifies the software update apparatus 14 of the subsequent CP. Subsequently in step S19, the software update apparatus 14 transmits a subsequent CP permission screen display request to the HMI 16. Next in step S20, the HMI 16 displays a subsequent CP permission screen 16a as shown in FIG. 14 on a display unit of the HMI 16 in response to the subsequent CP permission screen display request. FIG. 14 is a diagram showing an example of the subsequent CP permission screen according to the first embodiment. CP permission includes pre-permission performed at the time of selling a vehicle or the like, CP permission notification performed at the time of CP notification, and activation permission performed after an IG-OFF operation. The activation permission is described as an example in the present embodiment.

Subsequently in step S21, the user h1 operates a YES button 16a1 on the subsequent CP permission screen 16a to input subsequent CP permission or operates a NO button 16a2 to input subsequent CP non-permission. Next in step S22, the HMI 16 transmits operation information of the subsequent CP permission or the subsequent CP non-permission to the software update apparatus 14. Subsequently in step S23, the software update apparatus 14 transmits a permission result to the server 30 based on the operation information received from the HMI 16.

The server 30 executes step S24 when the permission result received from the software update apparatus 14 is the subsequent CP permission, but does not execute step S24 and ends the CP application processing when the permission result received from the software update apparatus 14 is the subsequent CP non-permission. When step S24 is ended, the CP application processing is ended. Details of an application sequence of the subsequent CP during DLing (the vehicle configuration synchronization) in step S24 will be described later.

Hereinafter, steps S25 to S33 are processing when it is determined in step S15 that the priority of the preceding CP<the priority of the subsequent CP (the priority of the preceding CP is "medium or low" and the priority of the subsequent CP is "high" in the example shown in FIG. 12), an update state of the preceding CP is during installation, and the subsequent CP has no CP application sequence dependency with respect to the preceding CP.

In step S25, the server 30 transmits a preceding CP installation interruption request to the software update apparatus 14. Subsequently in step S26, the software update apparatus 14 interrupts the installation of the preceding CP onto an ECU in an installation processing among the ECUs 1, 2, and 3 in response to the installation interruption request. Next, the same processing as that in steps S18 to S23 is respectively executed in steps S27 to S32.

Following step S32, the server 30 executes step S33 when a permission result received from the software update apparatus 14 is the subsequent CP permission, but does not execute step S33 and ends the CP application processing when the permission result is the subsequent CP non-permission. When step S33 is ended, the CP application processing is ended. Details of an application sequence of the subsequent CP during installation (the vehicle configuration synchronization) in step S33 will be described later.

Step S34 is processing when it is determined in step S15 that the priority of the preceding CP<the priority of the subsequent CP (the priority of the preceding CP is "low" and the priority of the subsequent CP is "medium" in the example shown in FIG. 12), an update state of the preceding CP is during waiting for activation (after an IG-OFF operation), and the subsequent CP has no CP application sequence dependency with respect to the preceding CP. When step S34 is ended, the CP application processing is ended. Details of an application sequence of the subsequent CP during waiting for activation (after an IG-OFF operation) in step S34 will be described later.

Step S35 is processing when it is determined in step S15 that priorities of the preceding CP and the subsequent CP, the preceding CP update state, and the presence or absence of the sequence dependency are different from the cases described above. When step S35 is ended, the CP application processing is ended. Details of a normal sequence in step S35 will be described later.

(Application Sequence of Subsequent CP During DLing (Vehicle Configuration Synchronization Trigger) According to First Embodiment)

Figure 15:
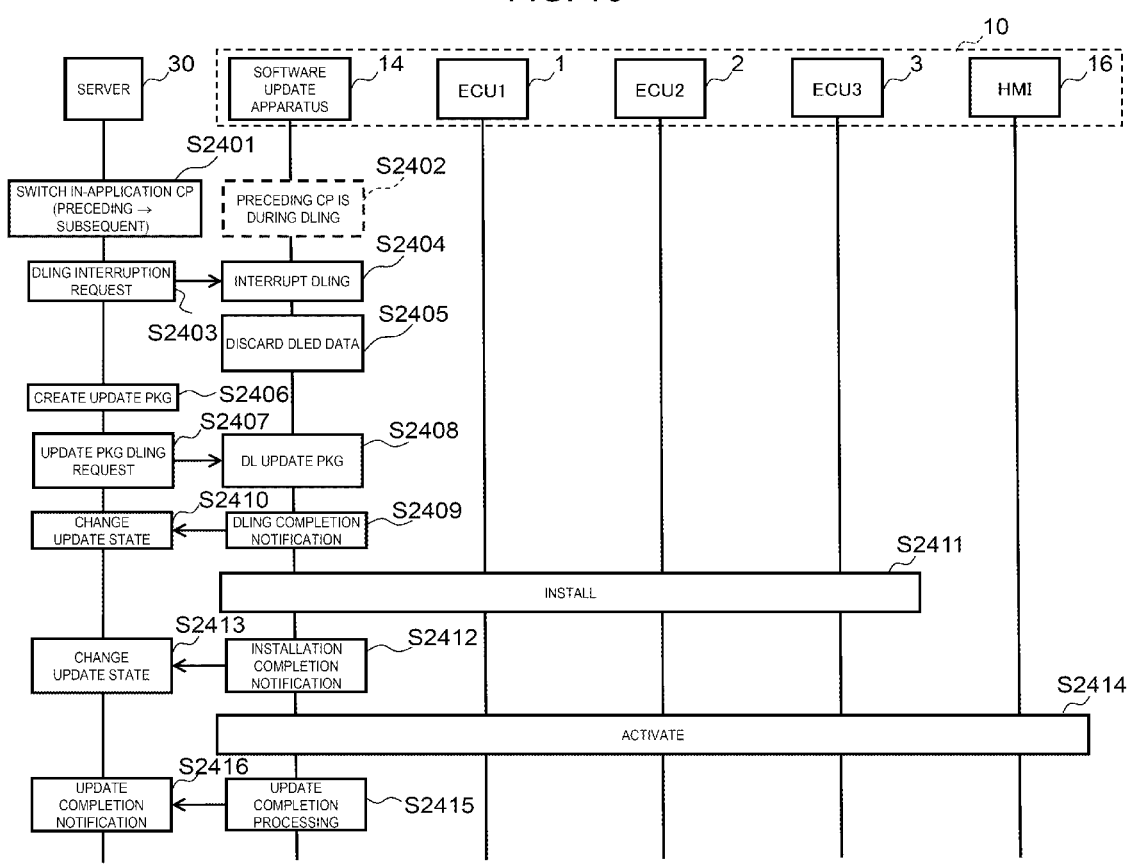
FIG. 15 is a diagram showing a detailed example of an application sequence of a subsequent CP during DLing (a vehicle configuration synchronization trigger) according to the first embodiment.

FIG. 15 is a diagram showing a detailed example of the application sequence of the subsequent CP during DLing (the vehicle configuration synchronization trigger) in step S24 shown in FIG. 12 according to the first embodiment. In the application sequence of the subsequent CP during DLing (the vehicle configuration synchronization trigger) according to the first embodiment, the DLing of the preceding CP is interrupted, and DLing, installation, and activation for an update PKG of the subsequent CP are performed.

First in step S2401, the server 30 switches an in-application CP from the preceding CP to the subsequent CP. At this time, the preceding CP is during DLing in the software update apparatus 14 as shown in step S2402.

Subsequently in step S2403, the server 30 transmits a DLing interruption request to the software update apparatus 14. Next, the software update apparatus 14 interrupts the DLing of the preceding CP in step S2404. Subsequently in step S2405, the software update apparatus 14 discards the DLed data.

Next in step S2406, the server 30 creates an update PKG of the subsequent CP based on an SW state of each ECU before the preceding CP is applied. Details of an update PKG creation processing will be described later. Subsequently in step S2407, the server 30 transmits an update PKG DLing request to the software update apparatus 14. Next in step S2408, the software update apparatus 14 performs DLing of the update PKG from the server 30.

Subsequently in step S2409, the software update apparatus 14 transmits a DLing completion notification to the server 30. Next in step S2410, when the DLing completion notification is received from the software update apparatus 14, the server 30 changes the update state 314b of the subsequent CP to "during installation" in the vehicle SW update management table 314.

Subsequently in step S2411, the software update apparatus 14 installs the update SW onto the target ECUs 1, 2, and 3 in accordance with the downloaded update PKG and the SW update instruction information. Next in step S2412, the software update apparatus 14 transmits an installation completion notification to the server 30. Subsequently in step S2413, when the installation completion notification is received from the software update apparatus 14, the server 30 changes the update state 314b of the subsequent CP to "during waiting for activation (before an IG-OFF operation)" in the vehicle SW update management table 314. After the IG-OFF operation, the update state 314b is changed to "during waiting for activation (after an IG-OFF operation)".

Next in step S2414, the software update apparatus 14 receives activation permission or non-permission for the subsequent CP from the user h1 of the vehicle 10 via the HMI 16 after the vehicle is IG-OFF. When the activation permission is received, the software update apparatus 14 activates the update SW of the subsequent CP installed onto the target ECUs 1, 2, and 3.

Subsequently in step S2415, the software update apparatus 14 transmits an update completion notification to the server 30. Next in step S2416, when the update completion notification is received from the software update apparatus 14, the server 30 deletes a value of the in-application campaign ID 314*c* corresponding to the subsequent CP in the vehicle SW update management table 314, and performs an update completion processing of changing the update state 314*b* to "during non-updating". Then, the application sequence of the subsequent CP during DLing (the vehicle configuration synchronization) is ended.

(Application Sequence of Subsequent CP During Installation (Vehicle Configuration Synchronization Trigger) According to First Embodiment)

Figure 16:
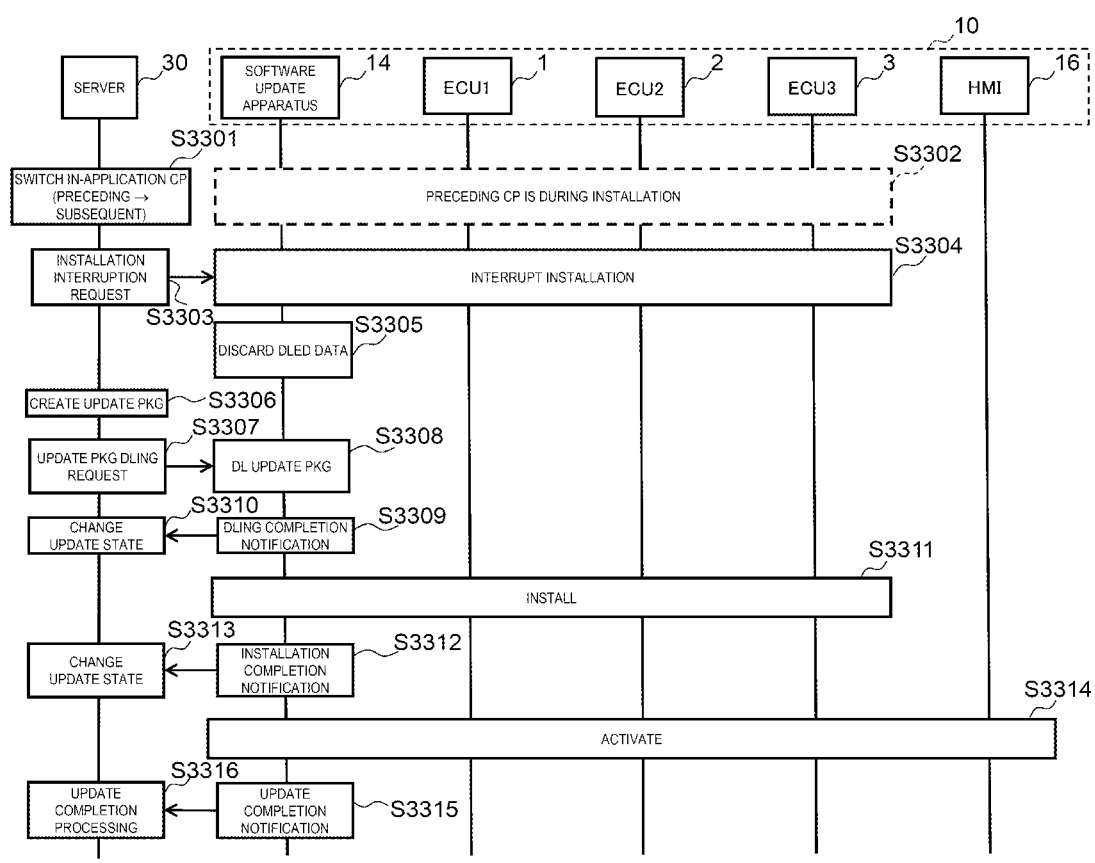
FIG. 16 is a diagram showing a detailed example of an application sequence of the subsequent CP during installation (a vehicle configuration synchronization trigger) according to the first embodiment.

FIG. 16 is a diagram showing a detailed example of the application sequence of the subsequent CP during installation (the vehicle configuration synchronization trigger) in step S33 shown in FIG. 12 according to the first embodiment. In the application sequence of the subsequent CP during installation (the vehicle configuration synchronization trigger) according to the first embodiment, the installation of the preceding CP is interrupted, and DLing, installation, and activation for an update PKG of the subsequent CP are performed.

First in step S3301, the server 30 switches an in-application CP from the preceding CP to the subsequent CP. At this time, in the software update apparatus 14, the preceding CP is during installation onto the ECUs 1, 2, and 3 that are update SW installation targets as shown in step S3302.

Subsequently in step S3303, the server 30 transmits an installation interruption request to the software update apparatus 14. Next in step S3304, the software update apparatus 14 and the target ECUs 1, 2, and 3 in which the update SW is during installation interrupt the installation of the preceding CP. At this time, the target ECUs 1, 2, and 3 in which the update SW is during installation delete data of the update SW during installation from a memory. Subsequently in step S3305, the software update apparatus 14 discards DLed data.

Subsequent steps S3306 to S3316 are respectively the same as steps S2406 to S2416 in FIG. 15. Then, the application sequence of the subsequent CP during installation (the vehicle configuration synchronization) is ended.

(Application Sequence of Subsequent CP During Waiting for Activation (After IG-OFF Operation) (Vehicle Configuration Synchronization Trigger) According to First Embodiment)

Figure 17:
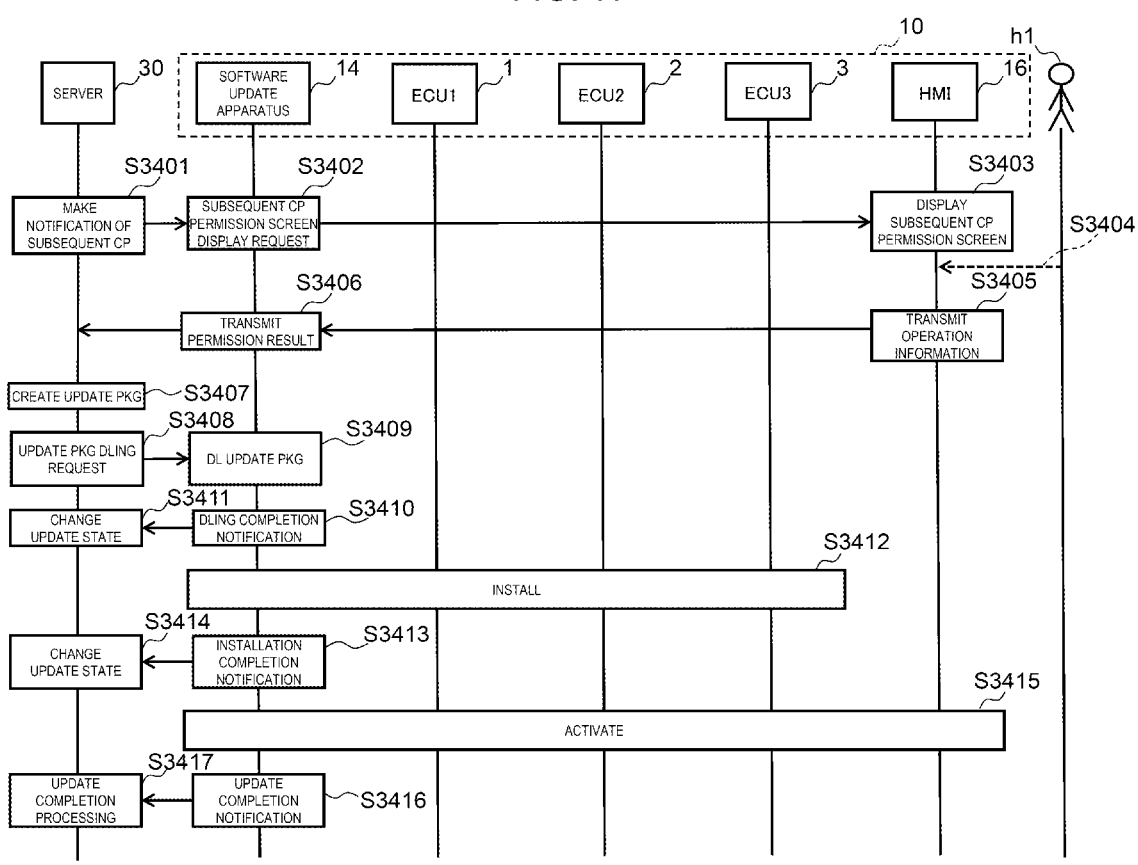
FIG. 17 is a diagram showing a detailed example of an application sequence of the subsequent CP during waiting for activation (after an IG-OFF operation) (a vehicle configuration synchronization trigger) according to the first embodiment.

FIG. 17 is a diagram showing a detailed example of the application sequence of the subsequent CP during waiting for activation (after an IG-OFF operation) (the vehicle configuration synchronization trigger) in step S34 shown in FIG. 12 according to the first embodiment. In the application sequence of the subsequent CP during waiting for activation (after an IG-OFF operation) (the vehicle configuration synchronization trigger) according to the first embodiment, the user of the vehicle 10 is notified of a matter that there is a subsequent CP having a higher priority, and an update PKG of the subsequent CP is created after the user permits and is DLed and applied.

First in step S3401, after an IG-OFF operation, the server 30 notifies the software update apparatus 14 that there is a subsequent CP having a "high" priority. Subsequently in step S3402, the software update apparatus 14 transmits a subsequent CP permission screen display request to the HMI 16. Next in step S3403, the HMI 16 displays the subsequent CP permission screen 16*a* as shown in FIG. 14 on the display unit of the HMI 16 in response to the subsequent CP permission screen display request.

Subsequently in step S3404, the user h1 operates the YES button 16*a*1 on the subsequent CP permission screen 16*a* to input subsequent CP permission or operates the NO button 16*a*2 to input subsequent CP non-permission. Next in step S3405, the HMI 16 transmits operation information of the subsequent CP permission or the subsequent CP non-permission to the software update apparatus 14. Subsequently in step S3406, the software update apparatus 14 transmits a permission result to the server 30 based on the operation information received from the HMI 16.

The server 30 executes steps S3407 to S3417 when the permission result received from the software update apparatus 14 is the subsequent CP permission, but does not execute steps S3407 to S3417 when the permission result received from the software update apparatus 14 is the subsequent CP non-permission and the CP application processing is ended.

Subsequent steps S3407 to S3417 are respectively the same as steps S2406 to S2416 in FIG. 15. Then, the application sequence of the subsequent CP during waiting for activation (after an IG-OFF operation) (the vehicle configuration synchronization trigger) is ended.

(Normal Sequence According to First Embodiment)

Figure 18:
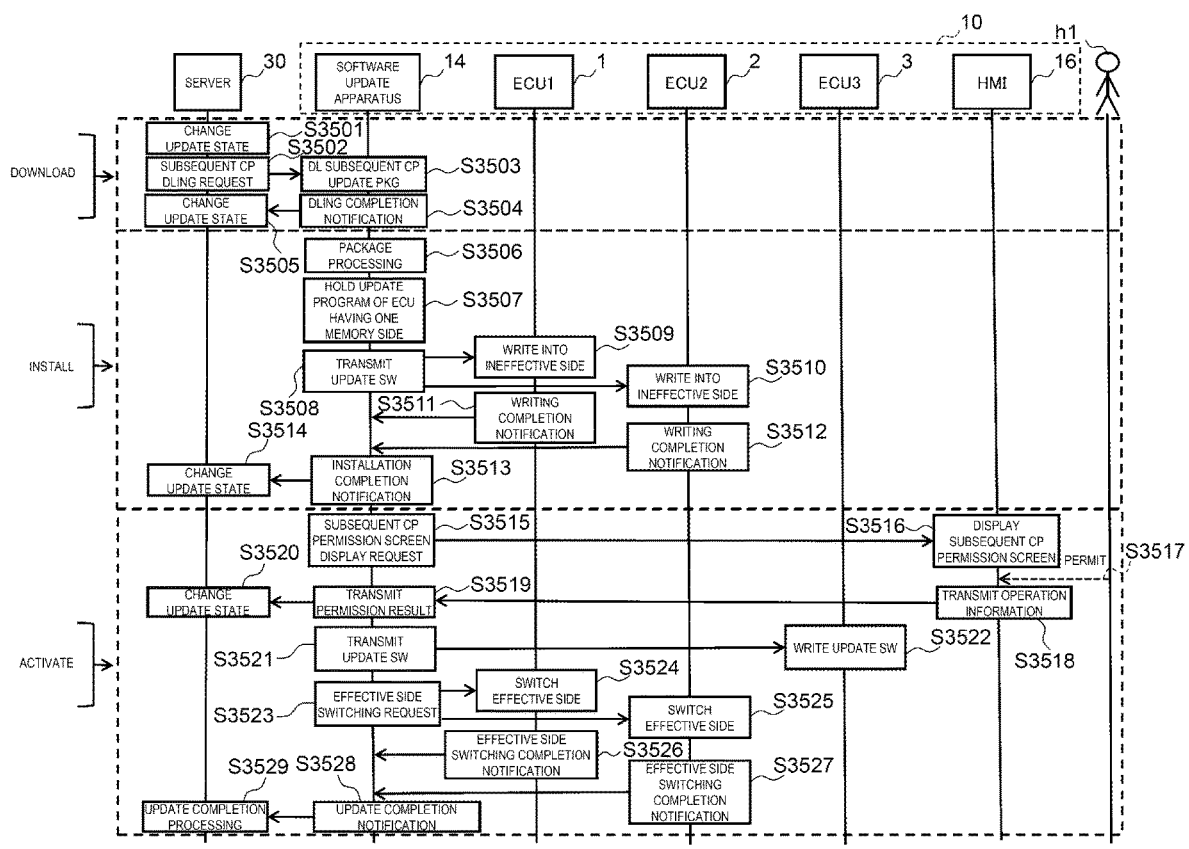
FIG. 18 is a diagram showing a detailed example of a normal sequence according to the first embodiment.

FIG. 18 is a diagram showing a detailed example of the normal sequence according to the first embodiment. In the normal sequence according to the first embodiment, the subsequent CP is applied after activation of the preceding CP is completed. An example is described in FIG. 18 in which the ECU 1 and the ECU 2 are ECUs having two memory sides and the ECU 3 is an ECU having one memory side, but the ECUs 1, 2, and 3 are not limited thereto.

In the normal sequence shown in FIG. 18, before starting the normal sequence, it is assumed that the server 30 executes an update package creation processing which will be described later with reference to FIG. 19 and an update PKG is created based on a state after the preceding CP is applied.

First, an update package downloading processing in steps S3501 to S3505 will be described. First in step S3501, the server 30 changes the update state 314*b* corresponding to the subsequent CP to "during DLing" in the vehicle SW update management table 314.

Subsequently in step S3502, the server 30 transmits a subsequent CP DLing request to the software update apparatus 14. Next in step S3503, the software update apparatus 14 DLs the update PKG of the subsequent CP from the server 30. Subsequently in step S3504, the software update apparatus 14 transmits a DLing completion notification to the server 30. Next in step S3505, when the DLing completion notification is received from the software update apparatus 14, the server 30 changes the update state 314*b* corresponding to the subsequent CP to "during installation" in the vehicle SW update management table 314.

Next, an update package installation processing in steps S3506 to S3513 will be described. Subsequent to step S3505, in step S3506, the software update apparatus 14 performs a package processing such as decryption, decompression, signature verification, and update SW application destination ECU checking for a DLed update PKG. Subsequently in step S3507, the software update apparatus 14 holds an update program of the ECU 3 having one memory side in a storage area of the software update apparatus 14.

Subsequently in step S3508, the software update apparatus 14 transmits the update SW to the ECUs 1 and 2 having two memory sides, respectively. In step S3509, the ECU 1 writes the update SW received from the software update apparatus 14 into an ineffective side of a memory of the ECU 1. In step S3510, the ECU 2 writes the update SW received from the software update apparatus 14 into an ineffective side of a memory of the ECU 2.

Subsequently in step S3511, when writing of the update SW to the memory of the ECU 1 is completed, the ECU 1 transmits a writing completion notification to the software update apparatus 14. Similarly, in step S3512, when writing of the update SW to the memory of ECU 2 is completed, the ECU 2 transmits a writing completion notification to the software update apparatus 14.

Next in step S3513, the software update apparatus 14 transmits an installation completion notification to the server 30. Even when writing of the update SW to the ECU having one memory side is not completed, the installation completion notification in step S3513 is transmitted as long as writing of the update SW to the ECU having two memory sides is completed. Subsequently in step S3514, when the installation completion notification is received from the software update apparatus 14, the server 30 changes the update state 314b corresponding to the subsequent CP to "during waiting for activation (before an IG-OFF operation)" in the vehicle SW update management table 314.

Next, an update package activation processing in steps S3515 to S3529 will be described. When it is notified that an IG-OFF operation of the vehicle 10 is performed by the user h1 between step S3514 and step S3515, the server 30 changes the update state 314b corresponding to the subsequent CP to "during waiting for activation (after an IG-OFF operation)" in the vehicle SW update management table 314.

Subsequently in step S3515, the software update apparatus 14 transmits a subsequent CP permission screen display request to the HMI 16. Next in step S3516, the HMI 16 displays the subsequent CP permission screen 16a as shown in FIG. 14 on the display unit of the HMI 16 in response to the subsequent CP permission screen display request.

Subsequently in step S3517, the user h1 operates the YES button 16a1 on the subsequent CP permission screen 16a to input subsequent CP permission or operates the NO button 16a2 to input subsequent CP non-permission. Next in step S3518, the HMI 16 transmits operation information of the subsequent CP permission or the subsequent CP non-permission to the software update apparatus 14. Subsequently in step S3519, the software update apparatus 14 transmits a permission result to the server 30 based on the operation information received from the HMI 16.

Next in step S3520, when the subsequent CP permission is received from the software update apparatus 14, the server 30 changes the update state 314b corresponding to the subsequent CP to "during activation" in the vehicle SW update management table 314.

Subsequently in step S3521, the software update apparatus 14 transmits update SW to the ECU 3 having one memory side. Next in step S3522, the ECU 3 writes the update SW received from the software update apparatus 14 into a memory of the ECU 3.

Subsequently in step S3523, the software update apparatus 14 transmits a memory effective side switching request to the ECUs 1 and 2. In steps S3524 and S3525, the ECU 1 and the ECU 2 respectively deactivate a current effective side in accordance with the memory effective side switching request from the software update apparatus 14, and activate the ineffective side into which the update SW has been written.

Next in steps S3526 and S3527, when effective side switching is completed, the ECU 1 and the ECU 2 respectively transmit an effective side switching completion notification to the software update apparatus 14.

Subsequently in step S3528, the software update apparatus 14 transmits an update completion notification to the server 30. Next in step S3529, when the update completion notification is received from the software update apparatus 14, the server 30 deletes a value of the in-application campaign ID 314c corresponding to the subsequent CP in the vehicle SW update management table 314, and performs an update completion processing of changing the update state 314b to "during non-updating". Then, the normal sequence is ended.

(Updated Package Creation Processing)

Figure 19:
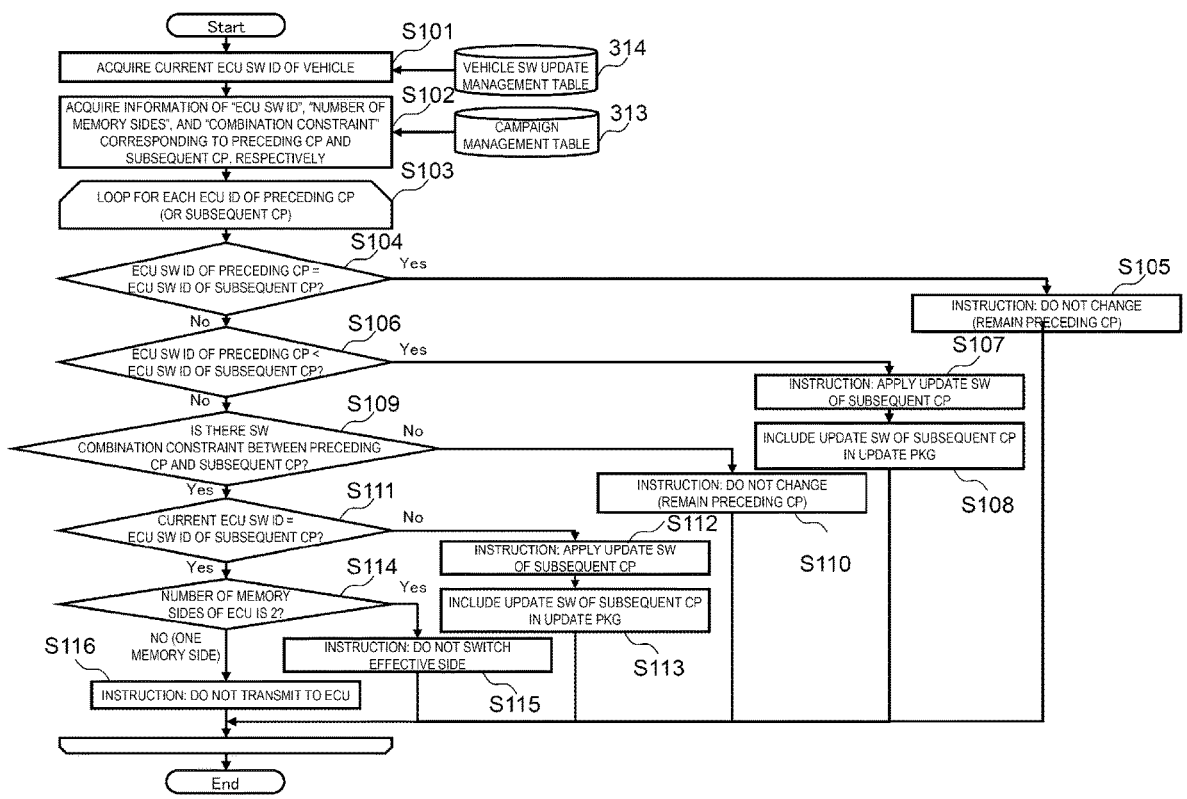
FIG. 19 is a flowchart showing an example of update package creation processing.

FIG. 19 is a flowchart showing an example of the update package creation processing. The update package creation processing is executed at the time of creating an update PKG in step S2406 of the application sequence of the subsequent CP during DLing (the vehicle configuration synchronization trigger) (see FIG. 15), step S3306 of the application sequence of the subsequent CP during installation (the vehicle configuration synchronization trigger) (see FIG. 16), step S3407 of the application sequence of the subsequent CP during waiting for activation (after an IG-OFF operation) (the vehicle configuration synchronization trigger) (see FIG. 17), and the like. The update package creation processing is executed by the update package creation unit 325 of the server 30.

First in step S101, the update package creation unit 325 acquires the ECU SW ID 314e associated with the vehicle 10 at a current time point in the vehicle SW update management table 314. Subsequently in step S102, the update package creation unit 325 refers to the campaign management table 313 and acquires the ECU ID 313i, the memory side number 313h, and the SW combination constraint 313j corresponding to the preceding CP and the subsequent CP, respectively.

Subsequently in step S103, the update package creation unit 325 selects one ECU ID to be processed in a loop (from steps S104 to S116) that will be repeated for ECU IDs of all preceding CPs (or subsequent CPs). In this loop, in step S104, the update package creation unit 325 determines whether an ECU SW ID of a preceding CP=an ECU SW ID of a subsequent CP for the ECU ID selected in step S103. When the ECU SW ID of the preceding CP=the ECU SW ID of the subsequent CP (Yes in step S104), an instruction of not changing SW of the subsequent CP having the ECU ID from the preceding CP (remaining the preceding CP) is included in the SW update instruction information (step S105).

On the other hand, when the ECU SW IDs do not match between the preceding CP and the subsequent CP (No in step S104), the update package creation unit 325 determines whether the ECU SW ID of the preceding CP<the ECU SW ID of the subsequent CP (an SW version of the preceding CP is older than an SW version of the subsequent CP) for the ECU ID selected in step S103 (step S106). When the ECU SW ID of the preceding CP<the ECU SW ID of the subsequent CP (Yes in step S106), the update package creation unit 325 includes an instruction of applying update SW of the subsequent CP corresponding to the ECU ID in the SW update instruction information (step S107). Subsequently in step S108, the update package creation unit 325 includes the update SW of the subsequent CP corresponding to the ECU ID in an update PKG.

On the other hand, when the ECU SW ID of the preceding CP the ECU SW ID of the subsequent CP (No in step S106), the update package creation unit 325 determines whether an SW combination constraint is present between the preceding CP and the subsequent CP (step S109). When no SW combination constraint is present between the preceding CP and the subsequent CP (No in step S109), the update package creation unit 325 includes an instruction of not changing SW of the subsequent CP having the ECU ID from the preceding CP (remaining the preceding CP) in the SW update instruction information (step S110).

On the other hand, when the SW combination constraint is present between the preceding CP and the subsequent CP (Yes in step S109), the update package creation unit 325 determines whether the current ECU SW ID of the vehicle 10 acquired in step S101=the ECU SW ID of the subsequent CP (step S111). When a relationship of the current ECU SW ID=the ECU SW ID of the subsequent CP is not satisfied (No in step S111), the update package creation unit 325 includes an instruction of applying the update SW of the subsequent CP corresponding to the ECU ID in the SW update instruction information (step S112). Subsequently in step S113, the update package creation unit 325 includes the update SW of the subsequent CP corresponding to the ECU ID in an update PKG.

On the other hand, when the current ECU SW ID=the ECU SW ID of the subsequent CP (Yes in step S111), the update package creation unit 325 determines whether the number of memory sides of the ECU having the ECU ID is 2 (step S114). When the number of memory sides of the ECU having the ECU ID is 2 (Yes in step S114), the update package creation unit 325 includes an instruction of not switching an effective side in the SW update instruction information (step S115).

On the other hand, when the number of memory sides of the ECU ID is 1 (No in step S114), the update package creation unit 325 includes an instruction of not transmitting the update SW to the ECU corresponding to the ECU ID in the SW update instruction information (step S116). When steps S105, S108, S110, S113, S115, or S116 is ended, the update package creation unit 325 proceeds the update package creation processing to step S103, selects a subsequent ECU ID, and performs processing in steps S104 to S116 for all ECU IDs.

As described above, the SW update instruction information that instructs details of a method for applying the subsequent CP is created and included in an update PKG based on an installation state of current SW in each ECU of the vehicle 10, so that the application of the subsequent CP can be efficiently performed.

According to the first embodiment, since the application of the preceding CP having a low priority is interrupted and the application of the subsequent CP having a high priority is started in any one of the cases in which the preceding CP in the vehicle 10 is during DLing, during installation, and during waiting for activation, the subsequent CP can be preferentially applied in any update state before the application of the preceding CP is completed. Since the interruption of the preceding CP and the start of the application of the subsequent CP are determined at respective timings of vehicle configuration synchronization when each vehicle 10 is IG-ON, timings of determination processing can be distributed, and loading concentration on the server 30 can be prevented.

Second Embodiment

The second embodiment is different from the first embodiment in that, in response to registration of a subsequent CP in a server, the server determines whether to interrupt an application of a preceding CP and perform an application of the subsequent CP to an ECU mounted on a vehicle.

(CP Application Processing Sequence (Server Trigger) According to Second Embodiment)

Figure 20:
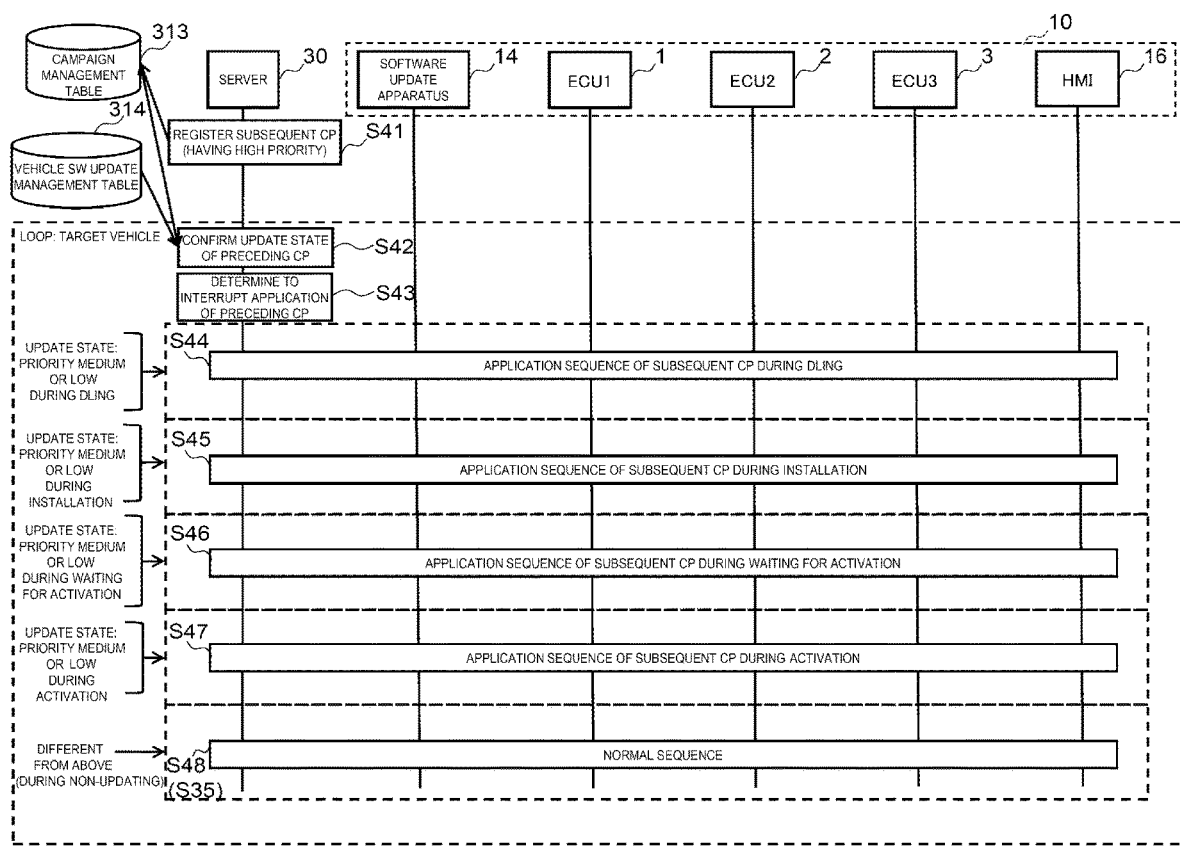
FIG. 20 is a diagram showing an example of a CP application processing sequence (a server trigger) according to a second embodiment.

FIG. 20 is a diagram showing an example of the CP application processing sequence (the server trigger) according to the second embodiment. First, the server 30 executes step S41 similarly to step S11 in FIG. 12. In response to the execution of step S41, the following steps S42 to S48 are executed.

Hereinafter, the server 30, the software update apparatus 14, the ECUs 1 to 3, and the HMI 16 perform loop processing of executing steps S42 to S48 for all vehicle IDs 314a registered in the vehicle SW update management table 314.

In step S42, the server 30 refers to the vehicle SW update management table 314 and confirms an update state of a preceding CP in the vehicle 10 to be processed this time. At this time, the server 30 refers to the campaign management table 313 to confirm a priority of the preceding CP and a priority of the subsequent CP and a CP application sequence dependency.

Subsequently in step S43, similarly to step S15 in FIG. 12, the server 30 determines whether to interrupt an application of the preceding CP and start an application of the subsequent CP based on the priority of the preceding CP and the priority of the subsequent CP, an update state of the preceding CP, and an application sequence dependency of the subsequent CP with respect to the preceding CP, which are confirmed in step S42.

Step S44 is processing when it is determined in step S43 that the priority of the preceding CP<the priority of the subsequent CP (the priority of the preceding CP is "medium or low" and the priority of the subsequent CP is "high" in the example shown in FIG. 20), an update state of the preceding CP is during DLing, and the subsequent CP has no CP application sequence dependency with respect to the preceding CP. Step S44 is different from step S24 shown in detail in FIG. 15 according to the first embodiment in that processing in step S2406 is executed before processing in step S2401. Other than this point, step S44 is similar to step S24 shown in FIG. 15.

Step S45 is processing when it is determined in step S43 that the priority of the preceding CP<the priority of the subsequent CP (the priority of the preceding CP is "medium or low" and the priority of the subsequent CP is "high" in the example shown in FIG. 20), an update state of the preceding CP is during installation, and the subsequent CP has no CP application sequence dependency with respect to the preceding CP. Step S45 is different from step S33 shown in detail in FIG. 16 according to the first embodiment in that processing in step S3306 is executed before processing in step S3301. Other than this point, step S45 is similar to step S33 shown in FIG. 16.

Step S46 is processing when it is determined in step S43 that the priority of the preceding CP<the priority of the subsequent CP (the priority of the preceding CP is "medium or low" and the priority of the subsequent CP is "high" in the example shown in FIG. 20), an update state of the preceding CP is during waiting for activation, and the subsequent CP has no CP application sequence dependency with respect to the preceding CP. Details of an application sequence of the subsequent CP during waiting for activation in step S46 will be described later.

Step S47 is processing when it is determined in step S43 that the priority of the preceding CP<the priority of the subsequent CP (the priority of the preceding CP is "medium or low" and the priority of the subsequent CP is "high" in the example shown in FIG. 20), an update state of the preceding CP is during activation, and the subsequent CP has no CP application sequence dependency with respect to the preceding CP. In step S47, the server 30 continues the application of the preceding CP.

Step S48 is processing when it is determined in step S43 that priorities of the preceding CP and the subsequent CP, an update state of the preceding CP, and the presence or absence of the sequence dependency are different from the cases described above. Details of a normal sequence in step S48 are the same as the details of the normal sequence in step S35 shown in FIG. 18.

(Application Sequence of Subsequent CP During Waiting for Activation (Sever Trigger) According to Second Embodiment)

Figure 21:
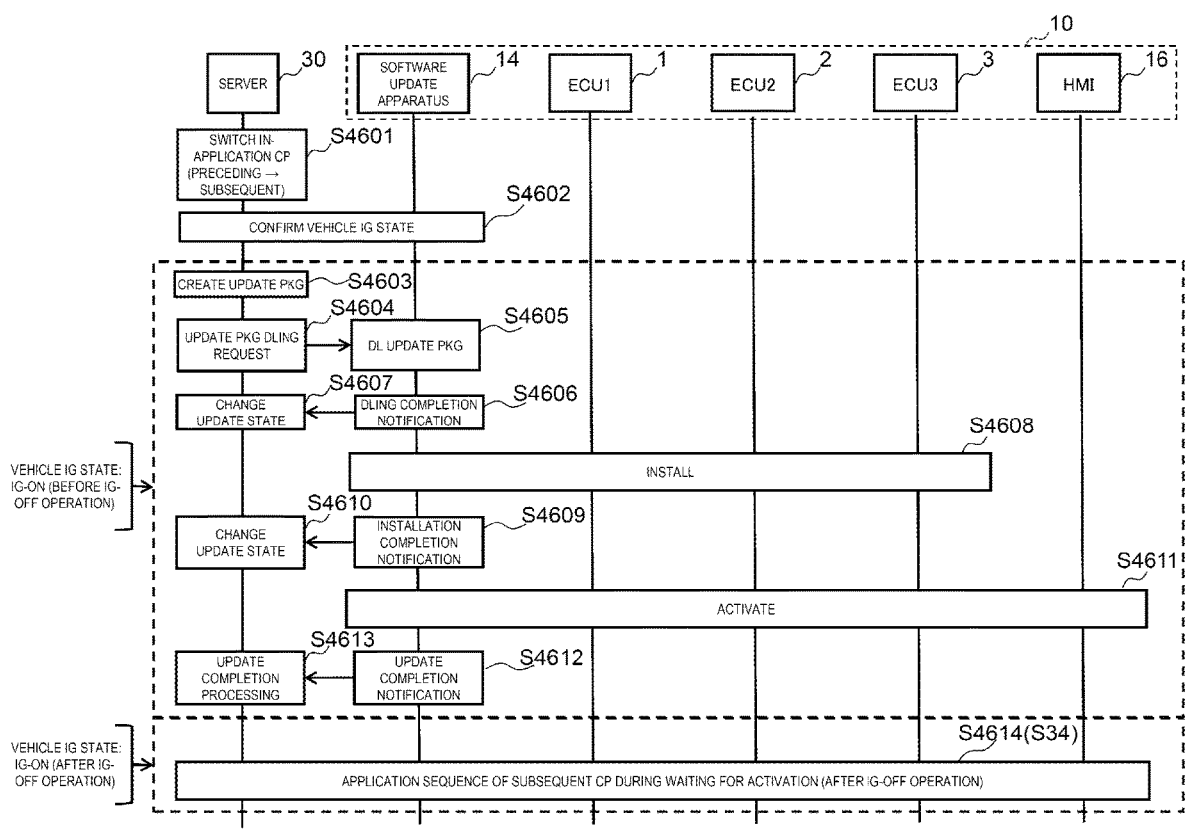
FIG. 21 is a diagram showing a detailed example of an application sequence of a subsequent CP during waiting for activation (a server trigger) according to the second embodiment.

FIG. 21 is a diagram showing a detailed example of the application sequence of the subsequent CP during waiting for activation (a server trigger) in step S46 shown in FIG. 20 according to the second embodiment.

First in step S4601, the server 30 switches an in-application CP from the preceding CP to the subsequent CP. Subsequently in step S4602, the server 30 and the software update apparatus 14 confirm whether an IG state of the vehicle 10 is IG-ON (before an IG-OFF operation) or IG-ON (after an IG-OFF operation).

The following steps S4603 to S4613 are processing when it is determined in step S4602 that the vehicle IG state is IG-ON (before an IG-OFF operation).

In step S4603, the server 30 creates an update PKG. At this time, the server 30 creates an update PKG of the subsequent CP based on a state after the preceding CP is installed. The server 30 determines update SW included in the update PKG and SW update instruction information in consideration of an SW combination constraint between the preceding CP and the subsequent CP and the number of memory sides of each ECU.

Subsequent steps S4604 to S4613 are respectively the same as steps S2407 to S2416 in FIG. 15.

On the other hand, step S4614 is processing when it is determined in step S4602 that the vehicle IG state is IG-ON (after an IG-OFF operation). Step S4614 is the same as the application sequence of the subsequent CP during waiting for activation (after an IG-OFF operation) in step S34 shown in FIG. 12. Details of step S4614 are the same as those shown in FIG. 17.

(Specific Example of Application of Subsequent CP During Waiting for Activation According to Second Embodiment)

Figure 22:
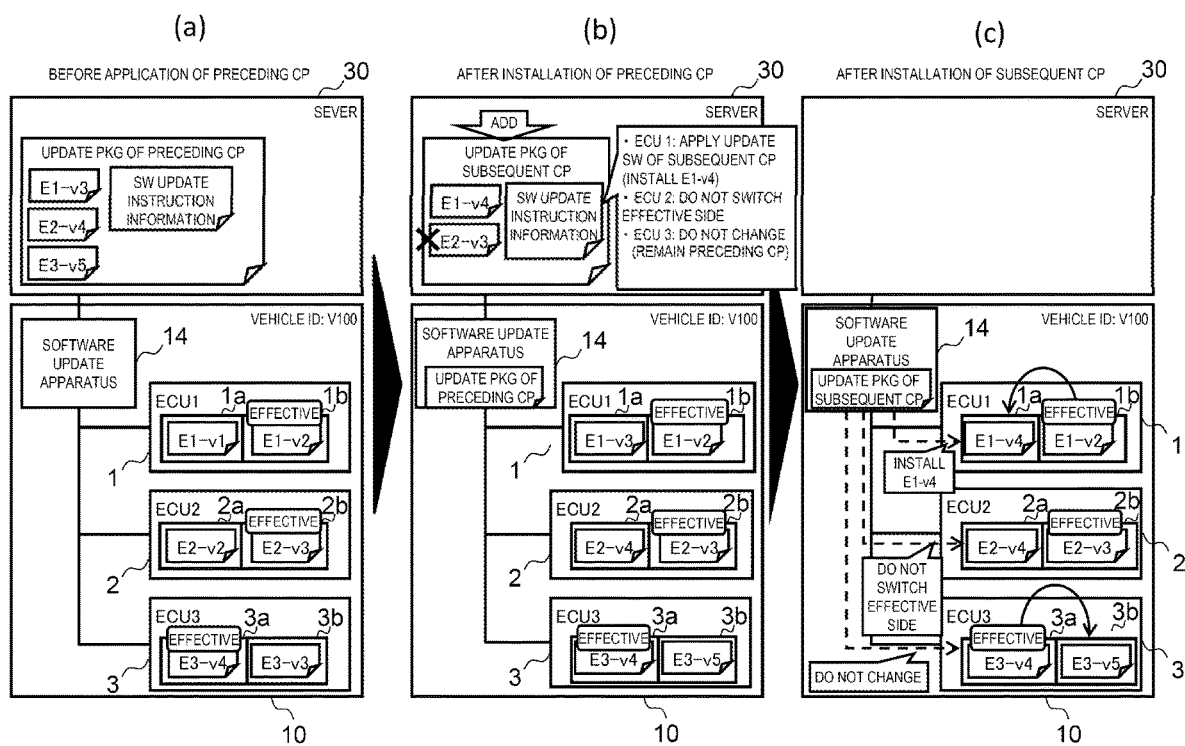
FIG. 22 illustrates diagrams showing a specific example of an update package application (to an ECU having two memory sides) when a vehicle IG state is IG-ON (before an IG-OFF operation) according to the second embodiment.
Figure 23:
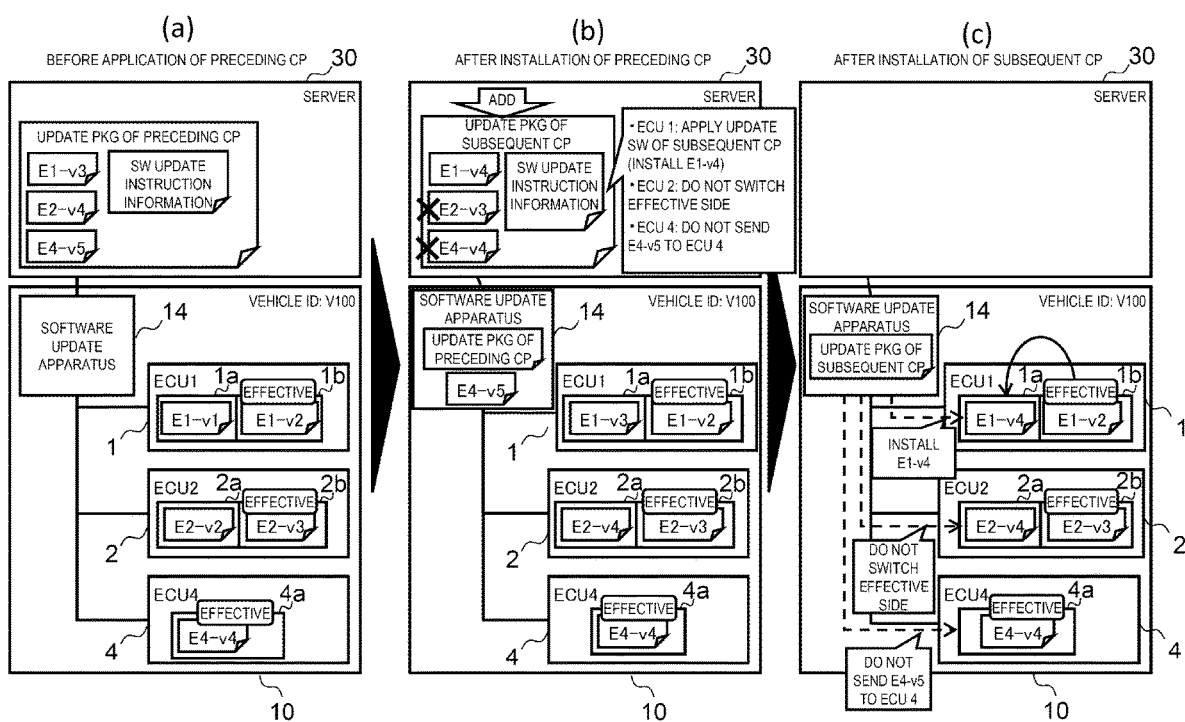
FIG. 23 illustrates diagrams showing a specific example of an update package application (to an ECU having one memory side) when a vehicle IG state is IG-ON (before an IG-OFF operation) according to the second embodiment.

FIG. 22 illustrates diagrams showing a specific example of an update package application (to an ECU having two memory sides) when a vehicle IG state is IG-ON (before an IG-OFF operation) according to the second embodiment. FIG. 23 illustrates diagrams showing a specific example of an update package application (to an ECU having one memory side) when a vehicle IG state is IG-ON (before an IG-OFF operation) according to the second embodiment. With reference to FIGS. 22 and 23, a case will be described in which an update PKG of the subsequent CP is created based on a state after the preceding CP is installed when the subsequent CP is added during waiting for activation of the preceding CP. The update PKG includes SW update instruction information in consideration of an SW combination and the number of memory sides of each ECU.

First, a case in which the vehicle 10 includes the ECUs 1 to 3 having two memory sides is described with reference to FIG. 22.

(b) in FIG. 22 shows a state during waiting for activation after an update package of the preceding CP is installed onto the ECUs 1, 2, and 3 of the vehicle 10 (vehicle ID: V100) before an application of the preceding CP shown in (a) in FIG. 22. As shown in (b) in FIG. 22, an ECU SW ID of E1-v3 is installed at a memory side 1a of the ECU 1 and an ECU SW ID of E1-v2 is installed at a memory side 1b (an effective side). An ECU SW ID of E2-v4 is installed at a memory side 2a of the ECU 2 and an ECU SW ID of E2-v3 is installed at a memory side 2b (an effective side). An ECU SW ID of E3-v4 is installed at a memory side 3a (an effective side) of the ECU 3 and an ECU SW ID of E3-v5 is installed at a memory side 3b. An update PKG of the preceding CP is held in a memory of the software update apparatus 14.

At this time, it is assumed that an update PKG of the subsequent CP is added in the server 30. The added updated PKG of the subsequent CP includes update SW of the ECU 1 (having an ECU SW ID of E1-v4), update SW of the ECU 2 (having an ECU SW ID of E2-v3), and SW update instruction information which is "ECU 1: apply update SW of the subsequent CP (install E1-v4); ECU 2: do not switch an effective side; ECU 3: do not change". An "x" is attached to the update SW (having an ECU SW ID of E2-v3) in (b) in FIG. 22, which refers to that the update SW (having an ECU SW ID of E2-v3) is not transmitted to the vehicle 10 (having a vehicle ID of V100).

Subsequently, the update PKG of the subsequent CP is downloaded from the server 30 to the vehicle 10, and update SW included in the update PKG of the subsequent CP is installed and activated in each ECU in accordance with the SW update instruction information. Specifically, E1-v4 is installed at the memory side 1a of the ECU 1 and an effective side is switched from the memory side 1b to the memory side 1a as shown in (c) in FIG. 22. Since E2-v3 is not installed onto the ECU 2 and an effective side is not switched, a pre-application state of the preceding CP in which the E2-v3 is activated at the memory side 2b can be used, and processing of installation and activation can be omitted to improve efficiency. E3-v5 installed at the memory side 3b is activated in the ECU 3 by the preceding CP.

Next, a case in which the vehicle 10 includes the ECUs 1 and 2 having two memory sides and an ECU 4 having one memory side instead of the ECU 3 will be described with reference to FIG. 23.

(b) in FIG. 23 shows a state during waiting for activation after an update package of the preceding CP is installed onto the ECUs 1, 2, and 4 of the vehicle 10 (vehicle ID: V100) before an application of the preceding CP shown in (a) in FIG. 23. As shown in (b) in FIG. 23, E1-v3 is installed at the memory side 1a of the ECU 1 and E1-v2 is installed at the memory side 1b (an effective side). E2-v4 is installed at the memory side 2a of the ECU 2 and E2-v3 is installed at the memory side 2b (an effective side). E4-v4 is installed at a memory side 4a (an effective side) of the ECU 4. E4-v5 is held in a memory of the software update apparatus 14.

At this time, an update PKG of the subsequent CP is added in the server 30. The added updated PKG of the subsequent CP includes update SW of the ECU 1 (having an ECU SW ID of E1-v4), update SW of the ECU 2 (having an ECU SW ID of E2-v3), update SW of the ECU 4 (having an ECU SW ID of E4-v4), and SW update instruction information which is "ECU 1: apply update SW of the subsequent CP (install E1-v4); ECU 2: do not switch an effective side; ECU4: do not send E4-v5 to the ECU 4". An "x" is attached to update SW (having ECU SW IDs of E2-v3 and E4-v4) in (b) in FIG. 23, which refers to that the update SW having these ECU SW IDs is not transmitted to the vehicle 10 (having a vehicle ID of V100).

Subsequently, the update PKG of the subsequent CP is downloaded from the server 30 to the vehicle 10, and update SW included in the update PKG of the subsequent CP is installed in each ECU and activated in accordance with the SW update instruction information. Specifically, E1-v4 is installed at the memory side 1a of the ECU 1 and an effective side is switched from the memory side 1b to the memory side 1a as shown in (c) in FIG. 23. E2-v3 is not installed onto the ECU 2 and an effective side is not switched. E4-v5 held in the memory of the software update apparatus 14 is not sent to the ECU 4 and is discarded, and E4-v4 installed onto the memory side 4a before the application of the preceding CP remains.

In this manner, an update PKG of each CP is applied to each target ECU according to the SW update instruction information, so that an installation state of a memory of each ECU, for example, after installation of the preceding CP and before activation of the preceding CP can be used and the subsequent CP can be efficiently applied.

The update PKG of the subsequent CP in the server 30 may be created on-demand or in advance. The update PKG of the subsequent CP is created in advance, so that a period from when the update PKG is created up to when the subsequent CP is installed can be shortened, a memory state of an ECU can be prevented from changing from when the update PKG of the subsequent CP is created, and a mismatch during installation of the subsequent CP can be prevented from occurring.

According to the second embodiment, the server 30 determines whether to interrupt the application of the preceding CP and apply the subsequent CP to an ECU mounted on the vehicle 10 in response to registration of the subsequent CP in the server 30. Therefore, an application of an important subsequent CP can be quickly performed as soon as the important subsequent CP is registered.

Third Embodiment

The third embodiment is different from the first embodiment in that, in response to "vehicle configuration synchronization" when a vehicle is IG-ON, the software update apparatus 14 determines whether to interrupt an application of a preceding CP and perform an application of a subsequent CP to an ECU mounted on a vehicle.

Figure 24:
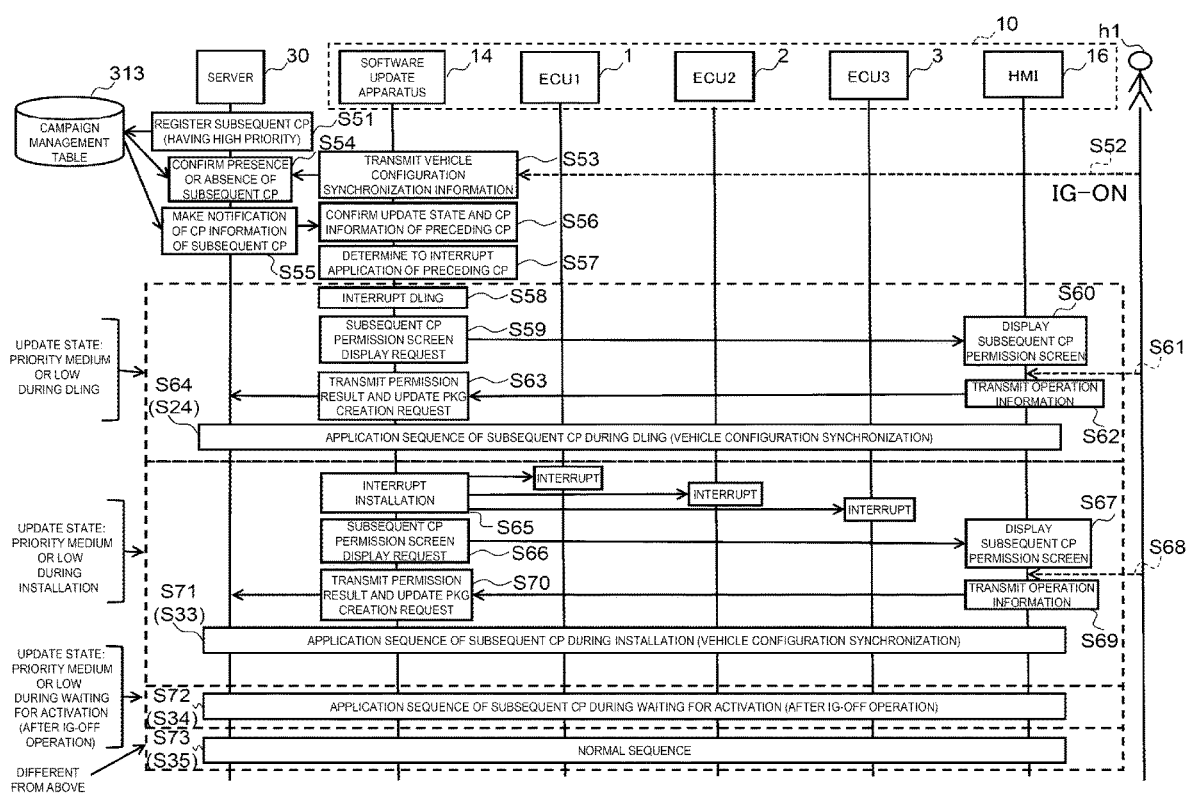
FIG. 24 is a diagram showing an example of a CP application processing sequence according to a third embodiment.

FIG. 24 is a diagram showing an example of a CP application processing sequence according to the third embodiment. Steps S51 to S53 in FIG. 24 are respectively the same as steps S11 to S53 in FIG. 12.

Subsequently in step S54, the server 30 refers to the campaign management table 313 and confirms the presence or absence of a subsequent CP for the vehicle 10 based on the vehicle configuration synchronization information 1411 received from the software update apparatus 14 of the vehicle 10. Next in step S55, when it is determined in step S54 that the subsequent CP is present, the server 30 notifies the software update apparatus 14 of campaign information of the subsequent CP read from the campaign management table 313.

Subsequently in step S56, when the campaign information of the subsequent CP is notified from the server 30, the software update apparatus 14 confirms an update state and campaign information of the preceding CP in the vehicle 10. At this time, the software update apparatus 14 refers to the campaign information 1412 of the preceding CP, and confirms a priority of the preceding CP and the presence or absence of a CP application sequence dependency between the preceding CP and the subsequent CP.

Subsequently in step S57, the software update apparatus 14 determines whether to interrupt the application of the preceding CP and start the application of the subsequent CP based on the priority of the preceding CP confirmed in step S56 and a priority of the subsequent CP, an update state of the preceding CP, and a CP application sequence dependency of the subsequent CP with respect to the preceding CP. Here, a determination logic of step S57 is the same as a determination logic of step S15 shown in FIG. 12, and details of step S57 are the same as those shown in FIG. 13.

Hereinafter, steps S58 to S64 are processing when it is determined in step S57 that the priority of the preceding CP<the priority of the subsequent CP (the priority of the preceding CP is "medium or low" and the priority of the subsequent CP is "high" in the example shown in FIG. 24), an update state of the preceding CP is during DLing, and the subsequent CP has no CP application sequence dependency with respect to the preceding CP.

In step S58, the software update apparatus 14 interrupts the DLing of the preceding CP. Subsequent steps S59 to S62 are the same as steps S19 to S22 in FIG. 12.

Subsequently in step S63, the software update apparatus 14 transmits, to the server 30, a permission result based on operation information received from the HMI 16 and a subsequent CP update PKG creation request. Next in step S64, the server 30, the software update apparatus 14, the ECUs 1 to 3, and the HMI 16 execute an application sequence of the subsequent CP during DLing (vehicle configuration synchronization) similarly to step S24 in FIG. 12.

Hereinafter, steps S65 to S71 are processing when it is determined in step S57 that the priority of the preceding CP<the priority of the subsequent CP (the priority of the preceding CP is "medium or low" and the priority of the subsequent CP is "high" in the example shown in FIG. 24), an update state of the preceding CP is during installation, and the subsequent CP has no CP application sequence dependency with respect to the preceding CP.

In step S65, the software update apparatus 14 interrupts installation of the preceding CP onto the ECUs 1, 2, and 3 in an installation processing. Subsequent steps S66 to S70 are the same as steps S59 to S63. Next in step S71, the server 30, the software update apparatus 14, the ECUs 1 to 3, and the HMI 16 execute an application sequence of the subsequent CP during installation (the vehicle configuration synchronization) similarly to step S33 in FIG. 12.

Steps S72 and S73 are respectively the same as steps S34 and S35 shown in FIG. 12.

According to the third embodiment, since the software update apparatus 14 determines whether to interrupt the application of the preceding CP and perform the application of the subsequent CP in the vehicle 10, a determination processing load on the server 30 can be distributed and reduced and an interruption determination for the preceding CP and the application of an important subsequent CP can be quickly performed.

Fourth Embodiment

According to the first to third embodiments, when the vehicle 10 is IG-OFF, an operation of the TCU 15 is stopped and an update PKG application processing cannot be continued. On the other hand, when the vehicle 10 is an electric automobile, it is assumed that the TCU 15 can be operated even when the vehicle 10 is IG-OFF and the update PKG application processing can be continued. According to the present embodiment, when the vehicle 10 is an electric automobile, an update PKG application processing having the following patterns 1 to 3 will be described. In the electric automobile, IG-ON or IG-OFF refers to power-on or power-off.

(Pattern 1)

In the pattern 1 according to the fourth embodiment, when a subsequent CP having a high priority is added during DLing of a preceding CP in a power-off state of the electric automobile, the DLing of the preceding CP is interrupted and discarded and DLing of the subsequent CP is started and then completed. When the DLing of the subsequent CP is completed, the update PKG application processing is temporarily stopped. When the electric automobile is power-on, installation of the subsequent CP onto an ECU having two memory sides is restarted.

The pattern 1 according to the fourth embodiment will be described with reference to FIG. 15 which shows a detailed example of the application sequence of the subsequent CP during DLing (the vehicle configuration synchronization trigger) according to the first embodiment. In the pattern 1, when the subsequent CP having a higher priority is added during DLing of the preceding CP, the processing in steps S2401 to S2410 shown in FIG. 15 is completed even in a power-off state of the electric automobile. Thereafter, the update PKG application processing is temporarily stopped. When the electric automobile is power-on after the update PKG application processing is temporarily stopped, installation of the subsequent CP onto an ECU having two memory sides is restarted in step S2411, and subsequent steps S2412 to S2416 are executed.

(Pattern 2)

In the pattern 2 according to the fourth embodiment, in a case in which the subsequent CP having a high priority is added during installation of the preceding CP when a battery of the electric automobile is charging, the installation of the preceding CP is interrupted, data is discarded, DLing of the subsequent CP is started, and installation of the subsequent CP is completed even in a power-off state. When the installation of the subsequent CP is completed, the update PKG application processing is temporarily stopped. When the electric automobile is IG-ON, activation (including installation of the subsequent CP onto an ECU having one memory side) is restarted.

The pattern 2 will be described with reference to FIG. 16 which shows a detailed example of the application sequence of the subsequent CP during installation (the vehicle configuration synchronization trigger) according to the first embodiment. In the pattern 2, the processing in steps S3301 to S3313 shown in FIG. 16 is completed even in a power-off state of the electric automobile. Thereafter, the update PKG application processing is temporarily stopped. When the electric automobile is power-on after the update PKG application processing is temporarily stopped, activation (including installation of the subsequent CP onto an ECU having one memory side) is restarted in step S3314, and subsequent steps S3315 to S3316 are executed.

(Pattern 3)

In the pattern 2, the installation of the subsequent CP onto ECU having one memory side may be completed at the same time when the DLing of the subsequent CP is started and the installation of the subsequent CP is completed. This is referred to as the pattern 3 according to the fourth embodiment. When the installation of the subsequent CP and the installation onto the ECU having one memory side are completed, the update PKG application processing is temporarily stopped. When the electric automobile is power-on, activation (only switching an effective side) is executed after update application permission is acquired from a user, so that the activation can be quickly executed.

Although an example in which the patterns 1 to 3 according to the fourth embodiment are combined with the first embodiment has been described above, the patterns 1 to 3 according to the fourth embodiment may be combined with the second embodiment and the third embodiment in a similar manner.

According to the fourth embodiment, the update PKG application processing can be temporarily stopped in response to power-off of the electric automobile, and an application of the subsequent CP can be restarted in response to power-on of the electric automobile. Thereafter, the application of the subsequent CP can be quickly completed.

Although embodiments of the invention have been described above, the invention is not limited to the embodiments described above and includes various modifications. For example, the embodiments described above have been described in detail for easy understanding of the invention, and the invention is not necessarily limited to those including all the configurations described above. Some information may be omitted or other information may be added to information that is described using a table format or the like. A part of configurations of an embodiment may be replaced with configurations of another embodiment, or the configurations of another embodiment may be added to the configurations of the embodiment. A part of configurations of each embodiment may be added, deleted, replaced, integrated, or distributed. The configurations and processing described in the embodiments may be appropriately distributed or integrated based on processing efficiency or mounting efficiency.

What is claimed is:

1. A server communicating, via a network, with a software update apparatus that updates software of an in-vehicle control device mounted on a vehicle, the server comprising:
a control unit configured to manage an application of a software update to the in-vehicle control device, wherein
the control unit
when a subsequent second software update to be applied to the in-vehicle control device is registered in the server during an application of a preceding first software update to the in-vehicle control device, determines whether to interrupt the application of the first software update and start an application of the second software update to the in-vehicle control device based on information relating to the application of the first software update, information relating to the application of the second software update, and an update processing state of the first software update to the in-vehicle control device,
the update processing state of the first software update includes at least during downloading of the first software update to the vehicle from the server, during installation of the downloaded first software update onto the in-vehicle control device, during waiting for activation of the installed first software update, and during activation of the first software update,
the information relating to the application of the first software update and the information relating to the application of the second software update respectively include an application priority of each software update and the presence or absence of an application combination constraint, the application combination constraint is an application sequence constraint relating to an application sequence of each software update, the control unit determines to interrupt the application of the first software update and start the application of the second software update to the in-vehicle control device when the second software update has a higher application priority than the first software update, an update state of the first software update is during installation, an update processing state of the first software update is during waiting for activation, and the application sequence constraint is not present, the control unit creates an update package including software relating to the second software update in a case in which the control unit determines to interrupt the application of the first software update and start the application of the second software update to the in-vehicle control device when the second software update has a higher application priority than the first software update, an update processing state of the first software update is during waiting for activation, and the application sequence constraint is not present, and with reference to software that has been installed onto a memory of the in-vehicle control device after the first software update is installed, includes in the update package, update instruction information including necessity of installing software to the memory and necessity of switching an effective side of the memory based on the application sequence constraint and the number of sides of the memory.

2. The server according to claim 1, wherein
the control unit determines to continue the application of the first software update to the in-vehicle control device when an update processing state of the first software update is during activation.

3. The server according to claim 2, wherein
the control unit determines to continue the application of the first software update to the in-vehicle control device when an update processing state of the first software update is any one of during downloading, during installation, and during waiting for activation, and the application sequence constraint is present.

4. The server according to claim 3, wherein
the control unit
when an update processing state of the first software update is during waiting for activation after an ignition-off operation of the vehicle, the application sequence constraint is not present, and an estimated time required for processing during activation of the first software update is larger than a predetermined value,
determines to interrupt the application of the first software update and start the application of the second software update to the in-vehicle control device, and
when the estimated time is equal to or less than the predetermined value, determines to continue the application of the first software update to the in-vehicle control device.

5. The server according to claim 4, wherein
the control unit determines whether to interrupt the application of the first software update and start the application of the second software update to the in-vehicle control device in response to an ignition-on operation of the vehicle.

6. The server according to claim 4, wherein
the control unit determines whether to interrupt the application of the first software update and start the application of the second software update to the in-vehicle control device in response to registration of the second software update in the server.

7. A software update system comprising:
an in-vehicle control device mounted on a vehicle;
a software update apparatus configured to update software of the in-vehicle control device; and
a server that configured to communicate with the software update apparatus via a network and manage an application of a software update to the in-vehicle control device, wherein
the server
when a subsequent second software update to be applied to the in-vehicle control device is registered in the server during an application of a preceding first software update to the in-vehicle control device,
determines whether to interrupt the application of the first software update and start an application of the second software update to the in-vehicle control device based on information relating to the application of the first software update, information relating to the application of the second software update, and an update processing state of the first software update to the in-vehicle control device, and
the software update apparatus
when the server determines to interrupt the application of the first software update and start the application of the second software update,
interrupts the application of the first software update and starts the application of the second software update to the in-vehicle control device,
the update processing state of the first software update includes at least during downloading of the first software update to the vehicle from the server, during installation of the downloaded first software update onto the in-vehicle control device, during waiting for activation of the installed first software update, and during activation of the first software update,
the information relating to the application of the first software update and the information relating to the application of the second software update respectively include an application priority of each software update and the presence or absence of an application combination constraint,
the application combination constraint is an application sequence constraint relating to an application sequence of each software update,
the server determines to interrupt the application of the first software update and start the application of the second software update to the in-vehicle control device when the second software update has a higher application priority than the first software update, an update state of the first software update is during installation, an update processing state of the first software update is during waiting for activation, and the application sequence constraint is not present,
the server creates an update package including software relating to the second software update in a case in which the server determines to interrupt the application of the first software update and start the application of the second software update to the in-vehicle control device when the second software update has a higher application priority than the first software update, an update processing state of the first software update is during waiting for activation, and the application sequence constraint is not present, and with reference to software that has been installed onto a memory of the in-vehicle control device after the first software update is installed, includes in the update package, update instruction information including necessity of installing software to the memory and necessity of switching an effective side of the memory based on the application sequence constraint and the number of sides of the memory.

8. A software update apparatus that is mounted on a vehicle and communicates, via a network, with a server managing an application of software to an in-vehicle control device mounted on the vehicle, the software update apparatus comprising:

an update control unit that updates software of the in-vehicle control device, wherein the update control unit when a subsequent second software update to be applied to the in-vehicle control device is registered in the server during an application of a preceding first software update to the in-vehicle control device, determines whether to interrupt the application of the first software update and start an application of the second software update to the in-vehicle control device based on information relating to the application of the first software update, information relating to the application of the second software update, and an update processing state of the first software update to the in-vehicle control device, and when it is determined to interrupt the application of the first software update and start the application of the second software update, interrupts the application of the first software update and starts the application of the second software update to the in-vehicle control device, the update processing state of the first software update includes at least during downloading of the first software update to the vehicle from the server, during installation of the downloaded first software update onto the in-vehicle control device, during waiting for activation of the installed first software update, and during activation of the first software update, the information relating to the application of the first software update and the information relating to the application of the second software update respectively include an application priority of each software update and the presence or absence of an application combination constraint, the application combination constraint is an application sequence constraint relating to an application sequence of each software update, the update control unit determines to interrupt the application of the first software update and start the application of the second software update to the in-vehicle control device when the second software update has a higher application priority than the first software update, an update state of the first software update is during installation, an update processing state of the first software update is during waiting for activation, and the application sequence constraint is not present, the update control unit creates an update package including software relating to the second software update in a case in which the update control unit determines to interrupt the application of the first software update and start the application of the second software update to the in-vehicle control device when the second software update has a higher application priority than the first software update, an update processing state of the first software update is during waiting for activation, and the application sequence constraint is not present, and with reference to software that has been installed onto a memory of the in-vehicle control device after the first software update is installed, includes in the update package, update instruction information including necessity of installing software to the memory and necessity of switching an effective side of the memory based on the application sequence constraint and the number of sides of the memory.

* * * * *